United States Patent
Kuwahara

(10) Patent No.: US 7,768,882 B2
(45) Date of Patent: Aug. 3, 2010

(54) FOCAL CONTROL ADJUSTING METHOD AND OPTICAL DISK APPARATUS

(75) Inventor: Masaya Kuwahara, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 881 days.

(21) Appl. No.: 11/413,121

(22) Filed: Apr. 28, 2006

(65) Prior Publication Data

US 2006/0262678 A1    Nov. 23, 2006

(30) Foreign Application Priority Data

Apr. 28, 2005  (JP) ............................. 2005-132662
Apr. 11, 2006  (JP) ............................. 2006-108530

(51) Int. Cl.
*G11B 7/00* (2006.01)
*G11B 20/18* (2006.01)

(52) U.S. Cl. ................................. 369/44.29; 369/53.28

(58) Field of Classification Search ............... 369/53.24, 369/53.28, 44.1
See application file for complete search history.

(56) References Cited

U.S. PATENT DOCUMENTS

| | | | | |
|---|---|---|---|---|
| 6,928,034 | B2 * | 8/2005 | Ohtsu et al. ............... | 369/44.29 |
| 7,057,982 | B2 * | 6/2006 | Aoe et al. ................. | 369/44.34 |
| 7,142,484 | B2 * | 11/2006 | Ando et al. ............... | 369/44.23 |
| 2006/0028945 | A1 * | 2/2006 | Huang et al. .............. | 369/53.13 |
| 2006/0104173 | A1 * | 5/2006 | Shibuya et al. ........... | 369/44.37 |

FOREIGN PATENT DOCUMENTS

| | | |
|---|---|---|
| JP | 04-134729 | 5/1992 |
| JP | 09-081942 A | 3/1997 |
| JP | 2000-082226 A | 3/2000 |
| JP | 2003-157547 | 5/2003 |
| JP | 2003-228846 | 8/2003 |
| JP | 2005-085397 | 3/2005 |
| WO | WO 2004/102546 A1 | 11/2004 |

OTHER PUBLICATIONS

Japanese Office Action issued in Japanese Patent Application No. JP 2006-108530 dated Dec. 8, 2009.

* cited by examiner

*Primary Examiner*—Wayne R Young
*Assistant Examiner*—Aneeta Yodichkas
(74) *Attorney, Agent, or Firm*—McDermott Will & Emery LLP

(57) ABSTRACT

A focal control adjusting method according to the present invention comprises a first step for detecting a focal error signal obtained through condensing and irradiating a light beam on a rotating recording medium, and a second step for setting a focal control gain for controlling a positional shift between a recording surface of the recording medium and the light beam based on the focal error signal detected in the first step, wherein a result obtained by multiplying the position detection signal (sub light beams) by a preset coefficient is added to the position detection signal (main light beam), and a result of the addition is detected as the focal error signal in the first step, and the coefficient is set in accordance with the focal error signal in the first step.

27 Claims, 16 Drawing Sheets

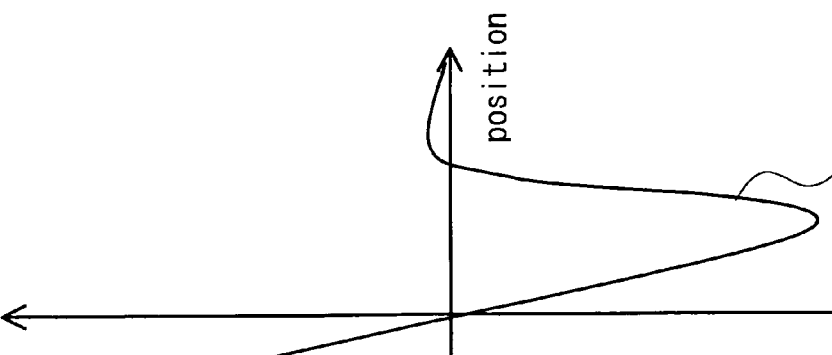
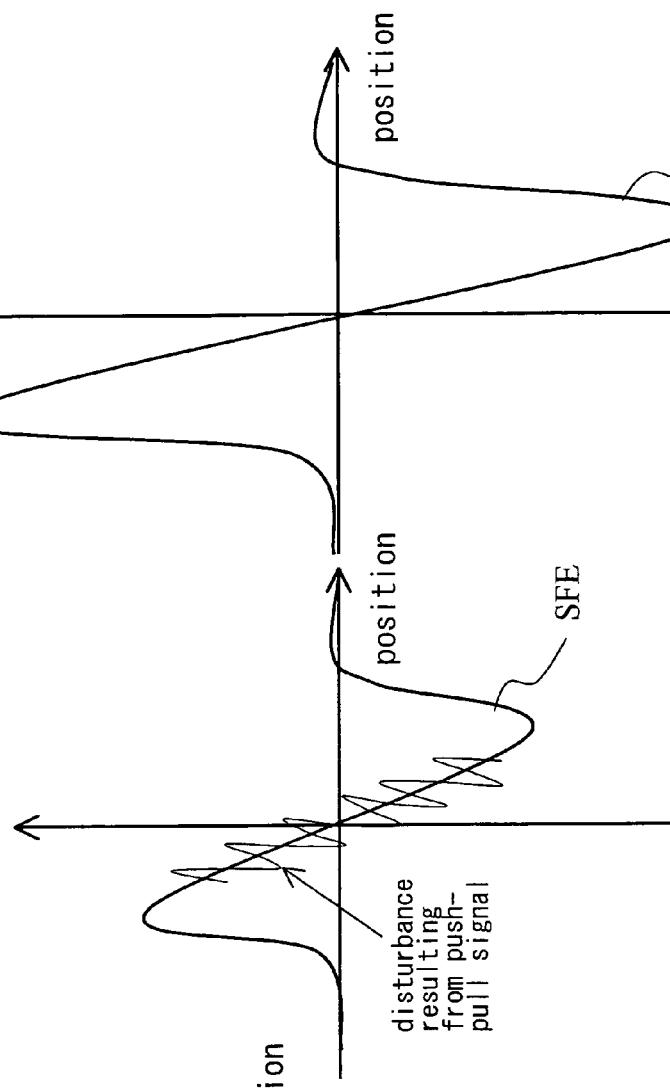
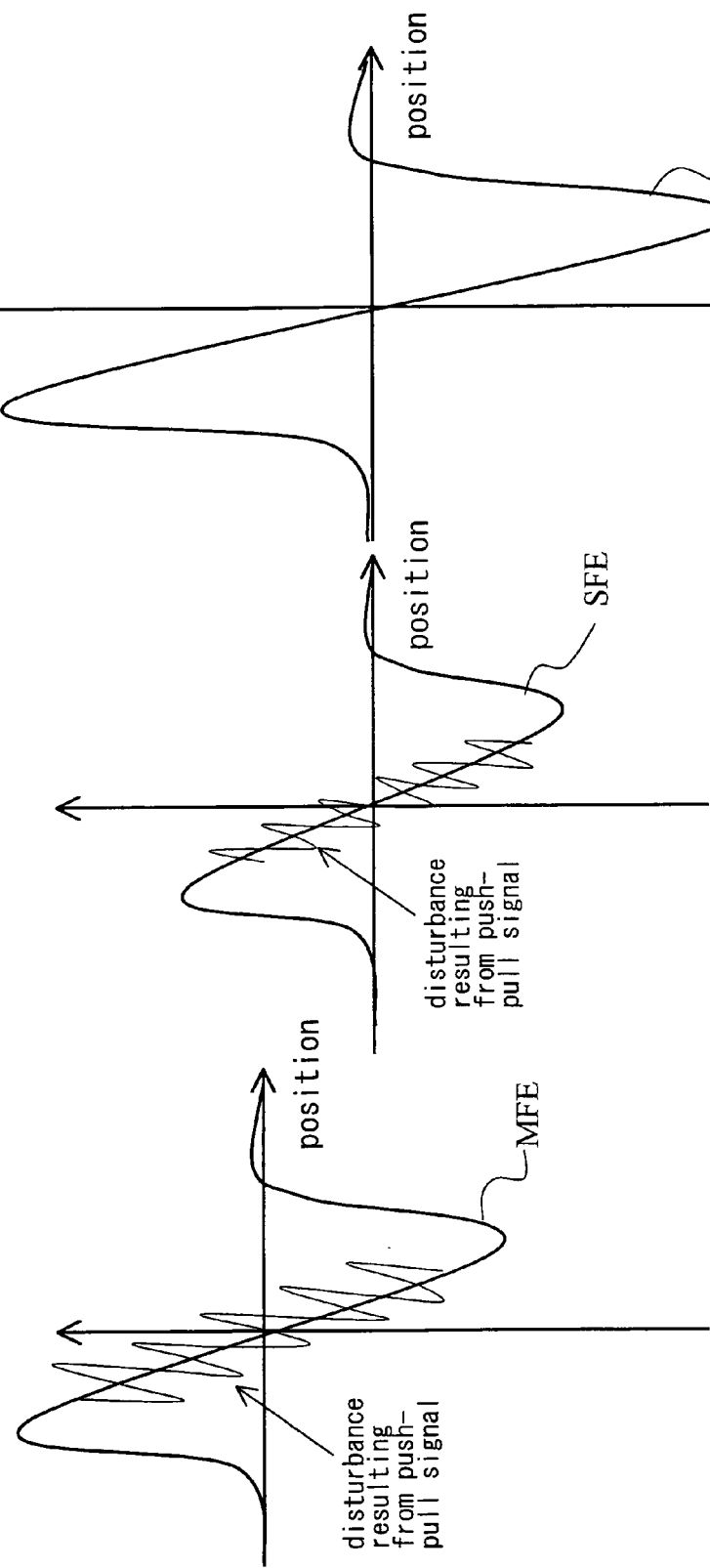

FOCAL CONTROL ADJUSTING METHOD AND OPTICAL DISK APPARATUS

BACKGROUND OF THE INVENTION

1. Field of the Invention

The present invention relates to an optical disk apparatus for reproducing or recording information to a recording medium such as DVD (Digital Versatile Disc) and a method to adjust focal control adapted in the apparatus.

2. Description of the Related Art

It was already known that there are a knife-edge method (Foucault method), a spot size detecting method, an astigmatic focal error method and the like as a conventional method to detect a focal error signal which represent a positional shift between a light beam of the optical disk apparatus and a recording surface of a recording medium. The astigmatic focal error method is the most popular one in standpoints of its simplified optical system and easiness in, adjustment and the like. In the astigmatic focal error method, a disturbance is easily generated in the focal error signal when a condensed spot of the light beam irradiated on the recording medium (hereinafter, refereed to as light beam spot) traverses a track on the recording medium. An influence caused by the disturbance is particularly remarkable in the case of a land/groove recording medium such as DVD-RAM because a width of a guiding groove (groove) provided on the recording medium and a width of an inter-groove space (land) are substantially equal to each other, and a depth of the guiding groove is set to a large value relative to a wavelength λ of the light beam (λ/6-λ/7), which increases an amplitude of a push-pull signal generated by diffraction through the guiding grooved.

An optical construction and a signal detecting circuit for controlling the disturbance superposed on the focal error signal when the light beam spot irradiated on the recording medium traverses the track on the recording medium are disclosed in the Patent Literature 1 (No. 2000-82226 of the Publication of the Unexamined Japanese Patent Applications; hereinafter, referred to as the Literature 1) and the Patent Literature 2 (No. H09-81942 of the Publication of the Unexamined Japanese Patent Applications; hereinafter, referred to as the Literature 2).

FIG. 16 is a schematic illustration of the optical construction of the optical pickup recited in the Literature 1. A light source 2-1 is an element to emit a light beam having the wavelength of, for example, 650 nm. The light beam emitted from the light source 2-1 enters a diffraction grating 2-2. The diffraction grating 2-2 separates the light beam into at least three light beams, which are a main light beam transmitting through the diffraction grating 2-2 in situ (zero-order light) and two sub light beams moving separately from the main light beam at a predetermined diffraction angle (positive first-order diffracted light and negative first-order diffracted light). These three light beams enters a collimate lens 2-4 via a polarized beam splitter 2-3, converted into a parallel light in the collimate lens 2-4, and condensed on a recording surface of a recording medium (hereinafter, referred to as disk) 1 such as a DVD-RAM via a starting mirror 2-10 and an object lens 2-5. The condensed light beams form light beam spots 100, 101 and 102. The light beams are reflected on the disk 1 and turn into a return light. The reflected light (return light) travels a same optical path as that of the irradiated light (outgoing light) and is reflected on a reflecting surface of the polarized beam splitter 2-3 via the object lens 2-5, starting mirror 2-10 and collimate lens 2-4. The reflected light (return light) reflected by the polarized beam splitter 2-3 is condensed on predetermined light receipt surfaces of light detectors 2-7, 2-8-1 and 2-8-2 via a condensing lens 2-6.

The light source 2-1, diffraction grating 2-2, polarized beam splitter 2-3, collimate lens 2-4, object lens 2-5, condensing lens 2-6, light detectors 2-7, 2-8-1 and 2-8-2, two-dimensional actuators 2-9-1 and 2-9-2, and starting mirror 2-10 constitute a unit of the optical pickup.

The three light receipt surfaces divided into four are substantially arranged linearly in the light detectors 2-7, 2-8-1 and 2-8-2. The respective main light beam and the two sub light beams (positive first-order diffracted light and negative first-order diffracted light) constituting the reflected light (return light) are condensed on positions at substantial centers of light receipt regions 200, 201 and 202, that is a position in each light receipt region wherein a point where a horizontal dividing line and a vertical dividing line intersect with each other crosswise and an intensity center of each light beam substantially correspond to one another. Because the light beams are respectively supplied with a predetermined astigmatic focal error by the condensing lens 2-6, a position detection signal based on the astigmatic focal error method is detected from each light receipt region, and the focal error signal is generated from these position detection signals.

The two-dimensional actuators 2-9-1 and 2-9-2 are attached to the object lens 2-5. The two-dimensional actuators 2-9-1 and 2-9-2 conduct automatic positional adjustment, namely, focal control of the object lens 2-5 based on the focal error signal, so that the irradiated light (light beam spots 100, 101 and 102) can be constantly and precisely irradiated on the recording surface of the disk 1.

However, in the case of generating the focal error signal based on the return light (reflected light), the disturbance is easily generated in the focal error signal because an intensity distribution pattern of the reflected light periodically changes under the influence of the diffraction by the guiding grooves in the disk 1, and leak of the push-pull signal component thereby generated.

Further, a phase of the disturbance component superposed on one of the position detection signals and a phase of the disturbance component superposed on the other position detection signal are not entirely inverted due to variations generated in a mounting precision of optical components of the optical pickup, a mounting precision of a transfer mechanism (track traverse mechanism) for arbitrarily moving the light beam spot in a direction to traverse the track of the disk 1, and the depths of the grooves in the disk, which contains a variety of phase components ranging from the same phase component to an inverted component in these phases. Accordingly, the disturbance component unfavorably remains in the focal error signal actually used for the focal control, which may deteriorate a focal control performance. As another disadvantage, there is no choice except to variously set a coefficient multiplied to the position detection signal in the canceling processing conducted in the conventional example described above, which also generates the situation where the disturbance component unfavorably remains in the focal error signal actually used for the focal control. Accordingly, there is a case that the focal control performance may be deteriorated.

As known from the foregoing description, there was a definite method in the past to determine the coefficient multiplied to the position detection signal when the position detection signals are added to each other. In the conventional control method, drive currents applied to the actuators 2-9-1 and 2-9-2 as the focal control signal are excessively large, which disadvantageously increases loads to the actuators 2-9-1 and 2-9-2.

SUMMARY OF THE INVENTION

Therefore, a main object of the present invention is to provide a focal control adjusting method for controlling a disturbance component superposed on a focal error signal when a light beam spot traverses a track in an optical disk apparatus for executing focal control using the focal error signal to show a positional shift between a light beam and a recording surface of a recording medium which is represented by a position detection signal by a main reflected light and a position detection signal by a sub reflected light.

A focal control adjusting method according to the present invention comprises:

a first step for detecting a focal error signal obtained through condensing and irradiating a light beam to a rotating recording medium;

a second step for setting a focal control gain at controlling a positional shift between a recording surface of the recording medium and the light beam based on the focal error signal detected in the first step; and a third step to conduct focal adjustment of the light beam based on the focal error signal detected in the first step and the focal control gain set in the second step, wherein after three beam condensing spots are formed on the rotating recording medium by condensing and irradiating the light beam consisting of a main light beam and two sub light beams to the recording medium, a position detection signal (main light beam) indicating a position of the beam condensing spot in the main light beam is generated based on a main reflected light obtained through reflection of the main light beam on the recording medium, and position detection signal (sub light beams) indicating position of the beam condensing spot in the sub light beams are generated based on two sub reflected lights obtained through reflection of the sub light beams on the recording medium and having different phases from that of the main reflected light in the first step, and a result obtained through multiplying the position detection signal (sub light beams) by a preset coefficient is added to the position detection signal (main light beam), and a result of the addition is detected as the focal error signal in the first step, and the coefficient is set in accordance with the focal error signal in the first step.

An optical disk apparatus according to the present invention comprises:

light detectors to respectively receive a main reflected light obtained through reflection of the main light beam on the recording medium and two sub reflected lights obtained through reflection of the sub light beams on the recording medium and having different phases from that of the main reflected light, after three beam condensing spots are formed on the rotating recording medium by condensing and irradiating the light beam consisting of a main light beam and two sub light beams to the recording medium;

a focal error detector to add a result obtained through multiplying the position detection signal (sub light beams) by a preset coefficient to the position detection signal (main light beam) and detect a result of the addition as a focal error signal of the light beams, after generating a position detection signal (main light beam) to indicate a position of the beam condensing spot in the main light beam based on the main reflected light and position detection signal (sub light beams) to indicate position of the beam condensing spot in the sub light beams based on the sub reflected lights;

a focal controller to control a positional shift between the beam condensing spots and a recording surface of the recording medium based on the focal error signal; and a motor to control the recording medium, wherein the focal error detector sets the coefficient in accordance with a result of the control of the positional shift by the focal controller.

In the foregoing construction, a magnitude of the position detection signal (main light beam) is hypothetically set to A, a magnitude of the position detection signal (sub light beams) to B, the coefficient supplied to the position detection signal (sub light beams) to k, and a magnitude of the focal error signal to FE, the following equation is obtained.

$$FE = A + k \times B$$

Thereby, even in the case where the disturbance component remains in the focal error signal, the focal control can be realized in a stable manner without excessively increasing the focal control output.

The present invention is characterized in that the coefficient k is not set to a fixed value as in the conventional technology, but the magnitude of the coefficient k is dynamically adjusted in accordance with an amplitude change of the focal error signal. Thereby, even in the case where variations are generated in a mounting precision of optical components of an optical pickup, a mounting precision of a transfer mechanism for arbitrarily moving the light beam spot in a traverse direction on a track of the recording medium, and depths of disk grooves, the disturbance component superposed on the focal error signal due to a leaked-in push-pull signal can be dynamically controlled. As a result, the focal control performance can be achieved at a high precision.

According to the present invention, the coefficient used for the multiplication of the position detection signal (sub light beams) when the position detection signal (main light beam) and the position detection signal (sub light beams) are added to each other is dynamically adjusted in accordance with the amplitude change of the focal error signal. Accordingly, the disturbance superposed on the focal error signal is controlled, and the focal control operation can be stably realized even though the mounting precisions of the optical components and transfer mechanism, and depths of the disk grooves may vary.

Further, when the focal control gain and a rotational speed of the recording medium are dynamically adjusted in accordance with a degree of the disturbance, the focal control output can be controlled.

Further, when a moving speed by the transfer mechanism is dynamically adjusted in accordance with the degree of the disturbance, the focal control output can be controlled also in an interval where the light beam spot moves in the track traverse direction.

The technology according to the present invention can be useful for improving a performance of an optical disk apparatus to record or reproduce information to a recording medium such as DVD, and a performance of an instrument in which any optical disk apparatus of this type is installed.

BRIEF DESCRIPTION OF THE DRAWINGS

The other objects of the invention will become clear by the following description of preferred embodiments of the invention. A number of benefits not recited in this specification will come to the attention of the skilled in the art by conducting the present invention.

FIGS. 2A-2C are a relation diagram of a focal error signal to a relative position between an irradiating position of a light beam spot and a disk recording surface in the preferred embodiment 1.

DETAILED DESCRIPTION OF THE INVENTION

Figure 1:
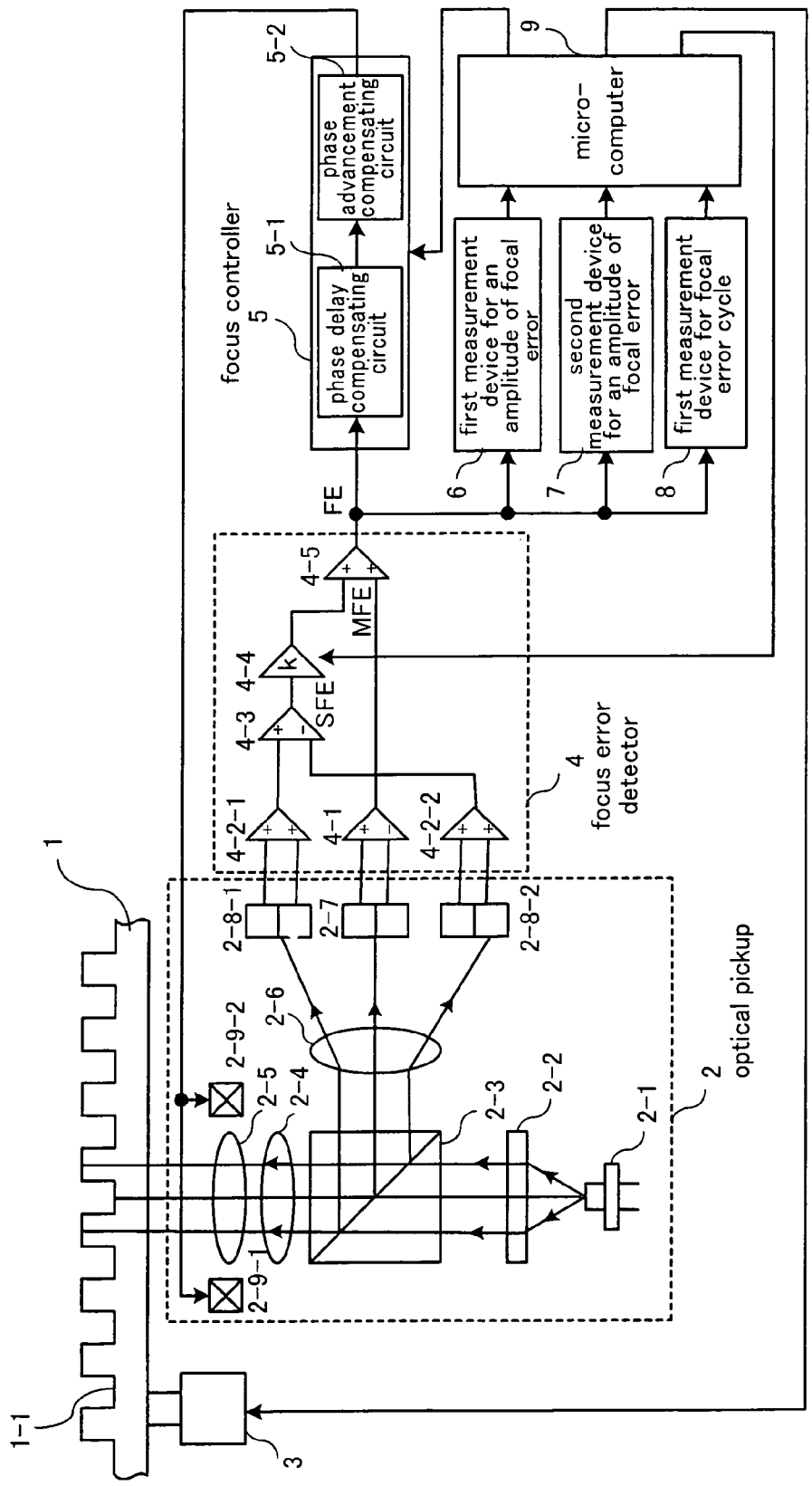
FIG. 1 is a first block diagram of an optical disk apparatus installed a focal control adjusting method in a preferred embodiment 1 of the present invention.

Hereinafter, preferred embodiments of an optical disk apparatus and a focal control adjusting method according to the present invention are described in detail referring to the drawings.

Preferred Embodiment 1

FIG. 1 is a block diagram illustrating an example of structure with respect to an optical disk apparatus in which a focal control adjusting method according to a preferred embodiment 1 of the present invention is conducted. In the optical disk apparatus, a DVD-RAM disk, which is an example of a recording medium (hereinafter, referred to as disk) 1, is installed. A motor 3 rotates the disk 1. The motor 3 is controlled in accordance with a rotational speed control signal S1 outputted from a microcomputer 9. A light source 2-1 is an element for emitting a light beam of, for example, 650 nm. The light beam emitted from the light source 2-1 enters a diffraction grating 2-2 so as to be divided therein into at least three light beams, which are a main light beam transmitting just through the diffraction grating 2-2 (zero-order light) and two sub light beams progressing separately from the main light beam at a predetermined diffraction angle (positive first-order diffracted light and negative first-order diffracted light). These three light beams enters a collimate lens 2-4 via a polarized beam splitter 2-3, converted into parallel lights in the collimate lens 2-4, and condensed on a recording surface of the recording medium (hereinafter, referred to as disk) 1 such as DVD-RAM via an object lens 2-5. The condensed light beams form three light beam spots on the recording surface. The condensed light beams are reflected on the disk 1 and turn into a reflected light (return light) traveling a same optical path as that of an irradiated light (outgoing light), and is reflected on a reflecting surface of the polarized beam splitter 2-3 via the object lens 2-5 and the collimate lens 2-4. The reflected light is condensed on predetermined light receipt surfaces of light detectors 2-7, 2-8-1 and 2-8-2 via a condensing lens 2-6.

The main light beam of the reflected light is condensed on the light detector 2-7, and the two sub light beams (positive first-order diffracted light and negative first-order diffracted light) of the reflected light are condensed on the light detectors 2-8-1 and 2-8-2. The main light beam is condensed on a substantially central position of a light receipt region. The sub light beams (positive first-order diffracted light and negative first-order diffracted light) are condensed respectively on positions at which the centers of their intensity are substantially identical. Because a predetermined astigmatic focal error is supplied to the reflected light by the condensing lens 2-6, a focal error signal based on the astigmatic focal error detection is detected in the light detectors 2-7, 2-8-1 and 2-8-2. The object lens 2-5 is provided with two-dimensional actuators 2-9-1 and 2-9-2.

An optical pickup 2 comprises the light source 2-1, diffraction grating 2-2, polarized beam splitter 2-3, collimate lens 2-4, object lens 2-5, condensing lens 2-6, light detectors 2-7, 2-8-1 and 2-8-2, and two-dimensional actuators 2-9-1 and 2-9-2.

The outputs from the light detectors 2-7, 2-8-1 and 2-8-2 are inputted to a first differential circuit 4-1, a first adding circuit 4-2-1 and a second adding circuit 4-2-2. The first differential circuit 4-1 detects an intensity difference of the main light beams (reflected light) and generates a position detection signal (main light beam) based on the main light beam. Hereinafter, the position detection signal (main light beam) is referred to as a main focal error signal ME. The main focal error signal MFE is inputted to a third adding circuit 4-5.

The first and second adding circuits 4-2-1 and 4-2-2 add the outputs of the light detectors 2-8-1 and 2-8-2 respectively and output it to a second differential circuit 4-3. The additions by the first and second adding circuits 4-2-1 and 4-2-2 are carried out in order to detect intensity differences of the respective sub light beams (reflected lights) The second differential circuit 4-3 detects the intensity differences of the sub light beams (reflected lights) based on the outputs of the first adding circuit 4-2-1 and the second adding circuit 4-2-2 and generates position detection signal (sub light beams) based on the sub light beams from a result of the detection. Hereinafter, the position detection signal (sub light beams) is referred to as a sub focal error signal SFE. The sub focal error signal SFE is inputted to a multiplying circuit 4-4, where the sub focal, error signal SFE is multiplied by a predetermined coefficient k.

The sub focal error signal SFE multiplied by the coefficient k is inputted to the third adding circuit 4-5. The third adding circuit 4-5 adds the output of the first differential circuit 4-1 and the output of the multiplying circuit 4-4 to each other to thereby generate the focal error signal FE. The focal error signal FE can be expressed by the following equation.

$$FE = MFE + k \times SFE \quad (1)$$

In the present preferred embodiment, a focal error detector 4 comprises the first differential circuit 4-1, first adding circuit 4-2-1, second adding circuit 4-2-2, second differential circuit 4-3, multiplying circuit 4-4, and third adding circuit 4-5.

When the focal error signal FE is detected from the reflected light by means of the astigmatic focal error method, disturbance is easily generated because an intensity distribution pattern of the reflected light periodically changes under the influence of diffraction in guiding grooves, and a push-pull signal component thereby generated leaks in. This is described below referring to FIGS. 2A-2C.

FIGS. 2A-2C respectively illustrate the focal error signals detected from the reflected lights of light beam spots 100, 101 and 102, wherein a signal amplitude is shown in a vertical axis and a relative position between an irradiating position and the recording surface of the disk 1 is shown in a horizontal axis. As shown in FIGS. 2A and 2B, when the position detection signal MFE obtained from the reflected light of the main light beam spot and the position detection signals SFE obtained from the reflected light of the two sub light beam (positive first-order diffracted light and negative first-order diffracted light) spots are compared to each other, the two signals are in-phase, while the phases of the disturbance components generated in the signals are inverse each other. Therefore, the result obtained through multiplying the position detection signals SFE (or sum of the signals) by the predetermined coefficient and the position detection signal MFE are added to each other in the third adding circuit 4-5, and thereby, the disturbance component superposed on the focal error signal FE outputted from the third adding circuit 4-5 is almost completely cancelled as shown in FIG. 2C.

The focal controller 5 carries out automatic positional adjustment, namely, focal control with respect to the object lens 2-5 based on the focal error signal FE supplied from the third adding circuit 4-5, and precisely makes the light beam spot irradiated on the recording surface of the disk 1. In the preferred embodiment 1, the focal controller 5 comprises a phase delay compensating circuit 5-1 and a phase advancement compensating circuit 5-2, wherein gains of the respective circuits are made variable.

The focal error signal FE is also inputted to a first measurement device for an amplitude of focal error 6, a second measurement device for an amplitude of focal error 7, and a first measurement device for focal error cycle 8. The first measurement device for an amplitude of focal error 6 and the second measurement device for an amplitude of focal error 7 measure an amplitude of the focal error signal FE from a maximum value and a minimum value of the focal error signal FE in a predetermined interval and outputs a result of the measurement to the microcomputer 9. The first measurement device for focal error cycle 8 measures a maximum cycle and a minimum cycle of the focal error signal FE in a predetermined interval and calculates an average value of the cycles, and outputs a result of the calculation to the microcomputer 9.

The microcomputer 9 determines the gain of the multiplying circuit 4-4, that is the coefficient k in the equation (1), based on the measurement result of the first measurement device for an amplitude of focal error 6, and sets the determined coefficient (gain) k in the multiplying circuit 4-4.

The microcomputer 9 determines a focal control gain based on the measurement result of the second measurement device for an amplitude of focal error 7 and sets the determined focal control gain in the focal controller 5. Further, the microcomputer 9 determines and sets a rotational speed of the motor 3 based on the measurement result of the first measurement device for focal error cycle 8.

Determination method will be described later with respect to the gain (coefficient) k of the multiplying circuit 4-4, gain of the focal controller 15 and rotational speed control signal S1 of the motor 3 are determined.

Figure 3:
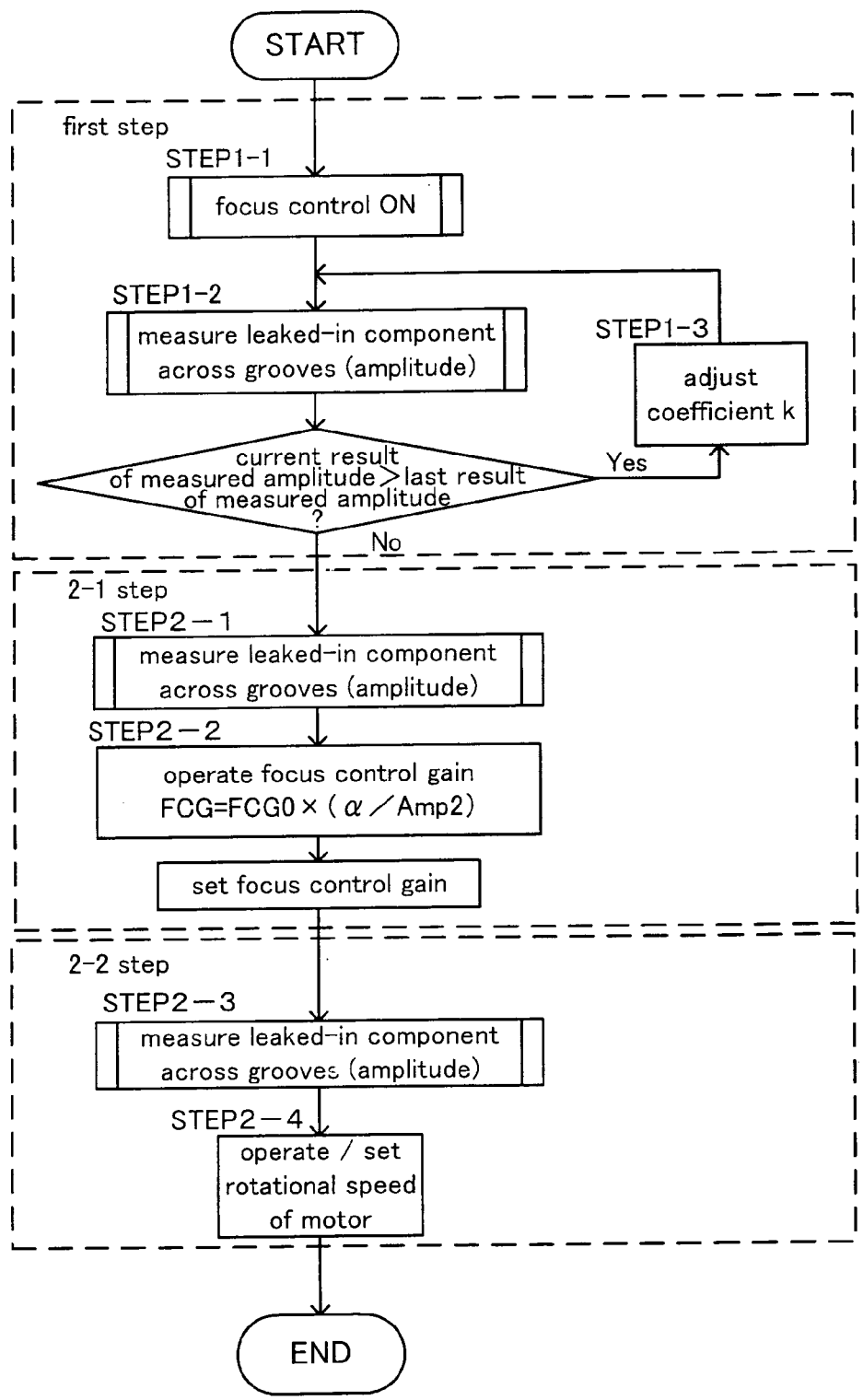
FIG. 3 is a flow chart of a first focal control adjusting method according to the preferred embodiment 1.

Below is described the focal control adjusting method according to the first preferred embodiment 1 referring to FIG. 3. FIG. 3 is a flow chart of an example of the focal control adjusting method according to the preferred embodiment 1.

1) As to First Step

In a first step, the gain k is adjusted in the multiplying circuit 4-4 that controls the most effectively the influence of the disturbance resulting from the leaked-in push-pull signal superposed on the focal error signal FE. Below is given a more detailed description.

First, a focal control loop is closed in a state where an arbitrary value is set as the coefficient k of the multiplying circuit 4-4 (STEP 1-1). Then, the first measurement device for an amplitude of focal error 6 measures the amplitude of the focal error signal FE from the maximum and minimum values thereof, and outputs the measured amplitude to the microcomputer 9 (STEP 1-2). The microcomputer 9 memorizes the measurement result of the first measurement device for an amplitude of focal error 6 and updates the coefficient k of the multiplying circuit 4-4 (STEP 1-3).

The operations from the STEP 1-2 to STEP 1-3 are repeated so that the coefficient k, which is the gain, of the multiplying circuit 4-4 is adjusted so that the output of the first measurement device for an amplitude of focal error 6 can be minimized.

It is desirable to make null the disturbance due to the leaked-in push-pull signal superposed on the focal error signal FE by repeating the operations from the STEP 1-2 to STEP 1-3. However, it may not be possible in some cases to make null the disturbance due to the leaked-in push-pull signal superposed on the focal error signal FE since mounting precisions of optical components of the optical pickup 2 and a transfer mechanism (not shown) to arbitrarily move the light beam in a direction to traverse the track of the disk, and depths of disk grooves may be variable.

The following steps are carried out in order to control the deterioration of the focal control performance even when the disturbance due to the leaked-in push-pull signal is superposed on the focal error signal FE.

2) As to Second 2-1 Step

After the operations of the STEP 1-1 to the STEP 1-3 are implemented, the second measurement device for an amplitude of focal error 7 measures the amplitude of the focal error signal FE based on the maximum and minimum values thereof and outputs the measurement result to the microcomputer 9 (STEP 2-1). The microcomputer 9 adjusts a gain FCG of the focal controller 5 in accordance with the measurement result of the second measurement device for an amplitude of focal error 7 (STEP 2-2). Assuming that the output of the second measurement device for an amplitude of focal error 7 is Amp2 and an initial gain value of the focal controller 5 is FCG0, for example, the focal control gain FCG is adjusted based on the following equation (2).

$$FCG = FCG0 \times (\alpha / Amp2) \quad (2)$$

In the equation (2), $\alpha$ is an arbitrary coefficient, and the focal control gain FCG is adjusted so as to be inversely proportional to the output Amp2 of the second measurement device for an amplitude of focal error 7. However, the executed focal control can be stabilized without supplying any excessively large drive signal to the two-dimensional actuators 2-9-1 and 2-9-2 because of the implementation of the STEP 2-1 and the STEP 2-2, however, there is some danger that a residual suppression performance of the focal control may be deteriorated in case that the focal control gain FCG is adjusted to be any value equal to or lower than an appropriate value. In order to avoid that, it becomes necessary to set a predetermined limit value as the focal control gain FCG to be adjusted by the STEP 2-1 and the STEP 2-2. Therefore, when the focal control gain FCG is smaller than the predetermined limit value in the calculation of the focal control gain FCG using the measured Amp2 based on the equation (2), the limit value may be set as the focal control gain FCG.

The gain adjusting method for the focal controller 5 described in the present preferred embodiment is only an example. As another example, in the STEP 2-2, the microcomputer 9 may retain at least two set values as the focal control gain FCG to be set in the focal controller 5, wherein one of the set values may be set in order to switch them depending on the output level of the second measurement device for an amplitude of focal error 7.

The focal controller 5 may be consisted of the phase delay compensating circuit 5-1 and the phase advancement compensating circuit 5-2, the microcomputer 9 may adjust only the gain of the phase advancement compensating circuit 5-2.

In the STEP 2-1, the first measurement device for focal error cycle 8 may measure the cycle of the focal error signal FE and adjust the gain of the focal controller 5 or the phase advancement compensating circuit 5-2 based on a minimum value, an average value or a maximum value of the measured cycle. For example, the microcomputer 9 may memorize a gain characteristic of the focal controller 5 per cycle of the cycle and adjust the gain characteristic so that the gain in the minimum value, average value or maximum value of the cycle of the focal error signal FE measured by the first measurement device for focal error cycle 8 corresponds to the gain characteristic memorized by the microcomputer 9. The gain characteristic is adjusted in the STEP 1-2 based on the amplitude of the focal error signal FE measured by the first measurement device for an amplitude of focal error 6.

The gain characteristic is more specifically adjusted, for example, as follows. Provided that the gain at the minimum value, average value or maximum value of the cycle of the focal error signal FE measured by the first measurement device for focal error cycle 8 is made FCGref, and the focal control gain FCG when the STEP 2-1 is implemented is made FCG0, the coefficient α in the equation (2) is obtained from the following equation (3).

$$\alpha = FCGref \times Amp2 / FCG0 \quad (3)$$

Thereafter, the coefficient α obtained in the equation (3) is expanded to the equation (2) so that the focal control gain FCG is set.

By conducting the STEP 2-1 and the STEP 2-2 described earlier, the focal control gain FCG can be appropriately adjusted even in the case where the disturbance due to the leaked-in push-pull signal is superposed on the focal error signal FE. As a result, the focal control can be stably realized without supplying any excessively large drive signal to the two-dimensional actuators 2-9-1 and 2-9-2.

3) As to 2-2 Step

When the first step and the 2-1 step are implemented, the focal control can be stably realized without supplying any excessively large drive signal to the two-dimensional actuators 2-9-1 and 2-9-2. However, in the case where the disturbance due to the leaked-in push-pull signal is large, the conduction of these steps may not obtain a sufficient effect. Therefore, after the focal control gain FCG is calculated based on the equation (2) and adjusted, the second measurement device for an amplitude of focal error 7 measures the amplitude of the focal error signal FE based on the maximum and minimum values thereof again, and outputs the measurement result to the microcomputer 9 (STEP 2-3).

The microcomputer 9 compares the measurement result of the second measurement device for an amplitude of focal error 7 to a predetermined value previously retained by the microcomputer 9, determines the rotational speed (double speed) of the motor 3 based on a result of the comparison, and outputs the rotational speed control signal S1 indicating the determined rotational speed to the motor 3. The motor 3 controls the rotation of the disk 1 to rotate at a predetermined rotation frequency in accordance with the rotational speed control signal S1 (STEP 2-4).

A disturbance frequency $d_f$ due to the leaked-in push-pull signal superposed on the focal error signal FE is in proportion to an eccentricity $x_{dec}$ of the disk 1 and a rotational speed $v_{mt}$ of the motor 3 as shown in following the equation (4).

$$d_f \propto (x_{dec}, v_{mt}) \quad (4)$$

The focal controller 5 comprises the phase delay compensating circuit 5-1 and the phase advancement compensating circuit 5-2. The phase advancement compensating circuit 5-2 amplifies the disturbance due to the leaked-in push-pull signal superposed on the focal error signal FE in accordance with the disturbance frequency $d_f$, which may excessively increases the output of the focal controller 5.

In order to deal with the disadvantage, by conducting the STEP 2-3 and the STEP 2-4, the rotational speed of the motor 3 can be appropriately adjusted even in the case where the disturbance due to the leaked-in push-pull signal is superposed on the focal error signal FE. As a result, the focal control can be stably realized without excessively increasing the output of the focal controller 5.

Figure 4:
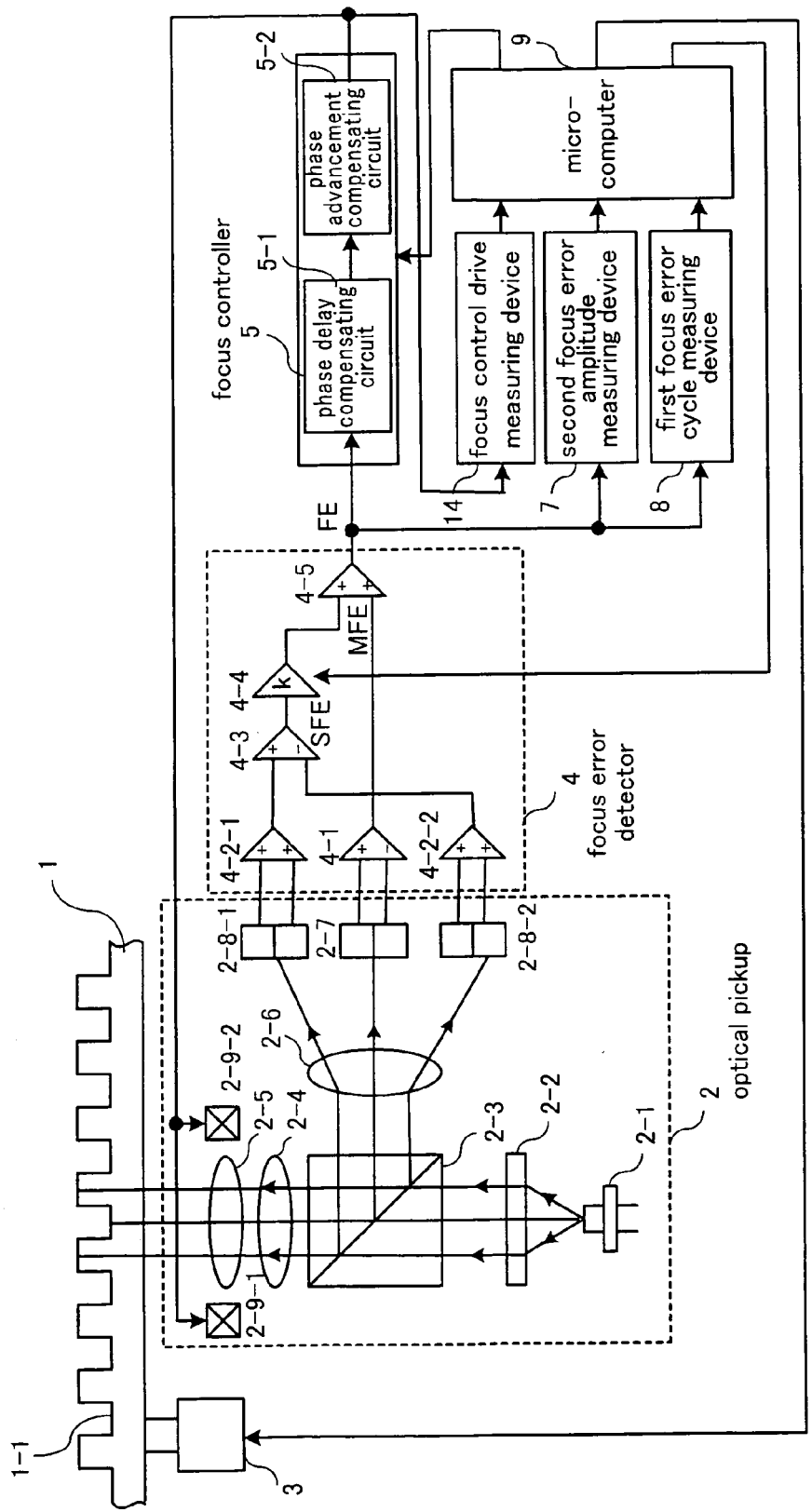
FIG. 4 is a second block diagram of the optical disk apparatus installed the focal control adjusting method according to the preferred embodiment 1.
Figure 5:
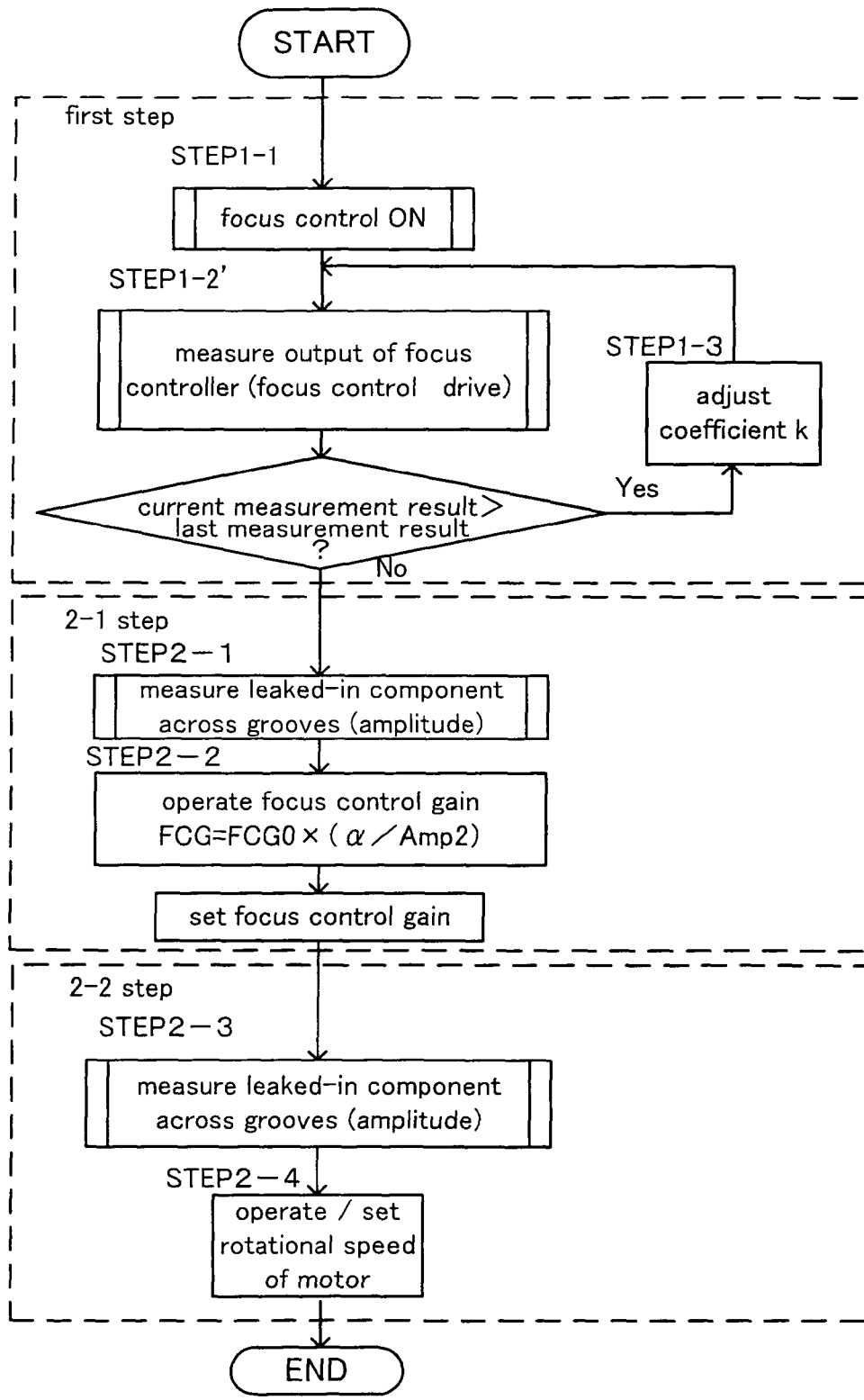
FIG. 5 is a flow chart of a second focal control adjusting method according to the preferred embodiment 1.

The construction shown in FIG. 1 may be changed to the construction shown in FIG. 4, and the operations shown in the flow chart of FIG. 3 may be changed to the operations shown in the flow chart of FIG. 5. FIG. 4 shows a modified embodiment of the optical disk apparatus according to the preferred embodiment 1 shown in FIG. 1. In this optical disk apparatus, the first measurement device for an amplitude of focal error 6 is replaced with a focal control drive measurement device 14 in the construction of FIG. 1. The focal control drive measurement device 14, to which the output of the focal controller 5 is inputted to, is provided with a function for measuring drive signals to the two-dimensional actuators 2-9-1 and 2-9-2 in a predetermined interval. An output of the focal control drive measurement device 14 is connected to the microcomputer 9. The microcomputer 9 determines the gain of the multiplying circuit 4-4, that is the coefficient k in the equation (1), based on a result of the measurement by the measurement device for driving focal control 14, and sets the determined coefficient k to the multiplying circuit 4-4.

FIG. 5 is a flow chart obtained by changing the STEP 1-2 in the first step in the focal control adjusting method according to the preferred embodiment 1 (flow chart of FIG. 3). More specifically, in the first step in FIG. 3, the first measurement device for an amplitude of focal error 6 measures the amplitude of the focal error signal FE based on the maximum and minimum values thereof, and outputs the measurement result to the microcomputer 9. The microcomputer 9 memorizes the measurement result of the first measurement device for an amplitude of focal error 6, and updates the coefficient k of the multiplying circuit 4-4 based on a result obtained by comparing the last measurement result of the measuring device 6 and the current measurement result of the measuring device 6. The updating processing is repeatedly executed.

In STEP 1-2' in the first step shown in FIG. 5, the output of the focal controller 5, that is a focal control drive signal, is measured and outputted to the microcomputer 9. The microcomputer 9 repeatedly updates the coefficient k of the multiplying circuit 4-4 based on the focal control drive signal measured by the measurement device for driving focal control 14 until the focal control drive signal is reduced to minimum.

According to the foregoing construction, the influence caused on the focal control drive signal by the disturbance due to the leaked-in push-pull signal superposed on the focal error signal FE can be minimized.

Figure 6:
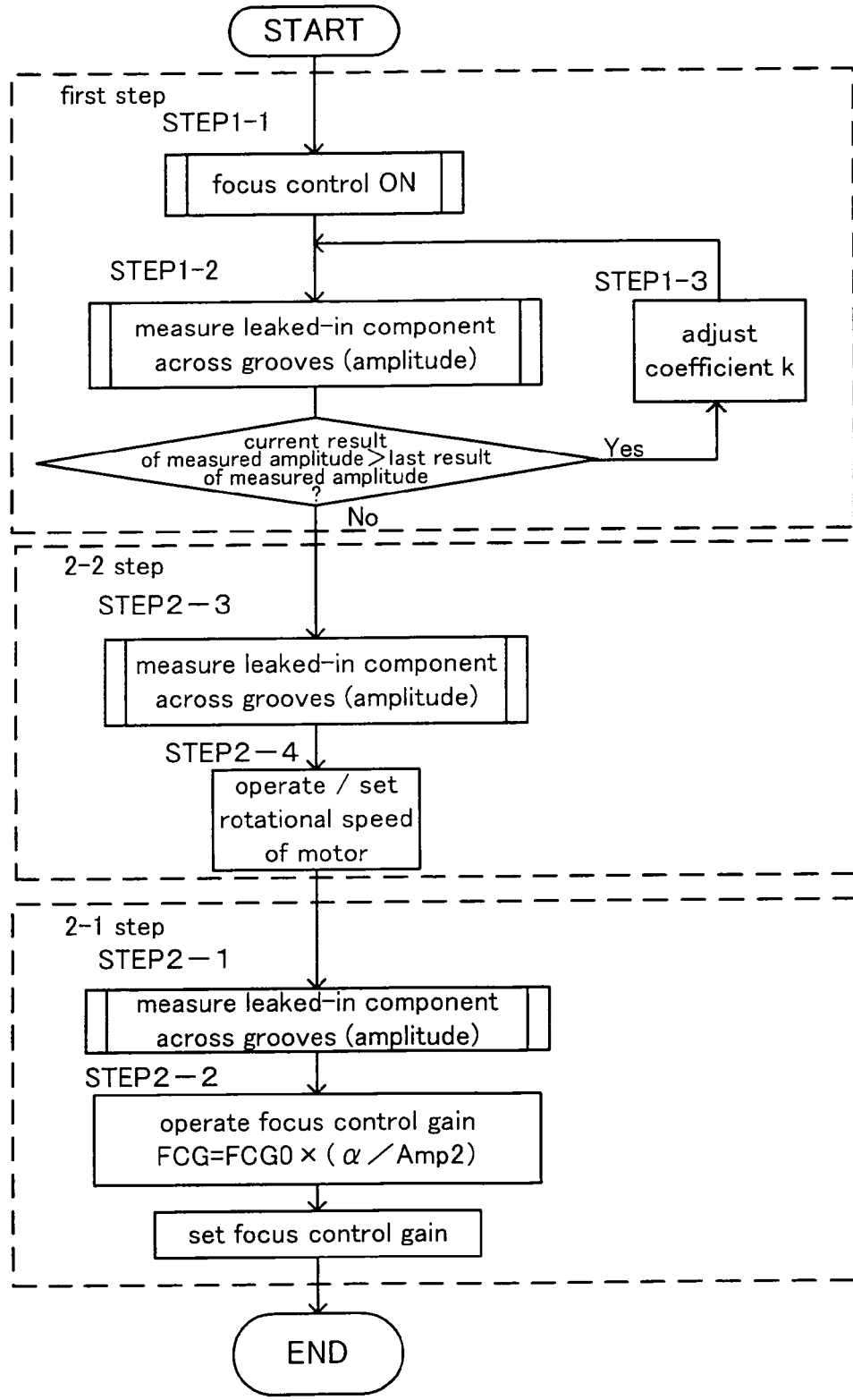
FIG. 6 is a flow chart of a third focal control adjusting method according to the preferred embodiment 1.

In the preferred embodiment 1, the first step, 2-1 step and 2-2 step are carried out in that order referring to FIGS. 1 and 3. However, even in the case that the 2-2 step and the 2-1 step may be carried out in that order after the first step is implemented as shown in FIG. 6 in stead of FIG. 3, it is obvious to exert a similar effect.

Figure 7:
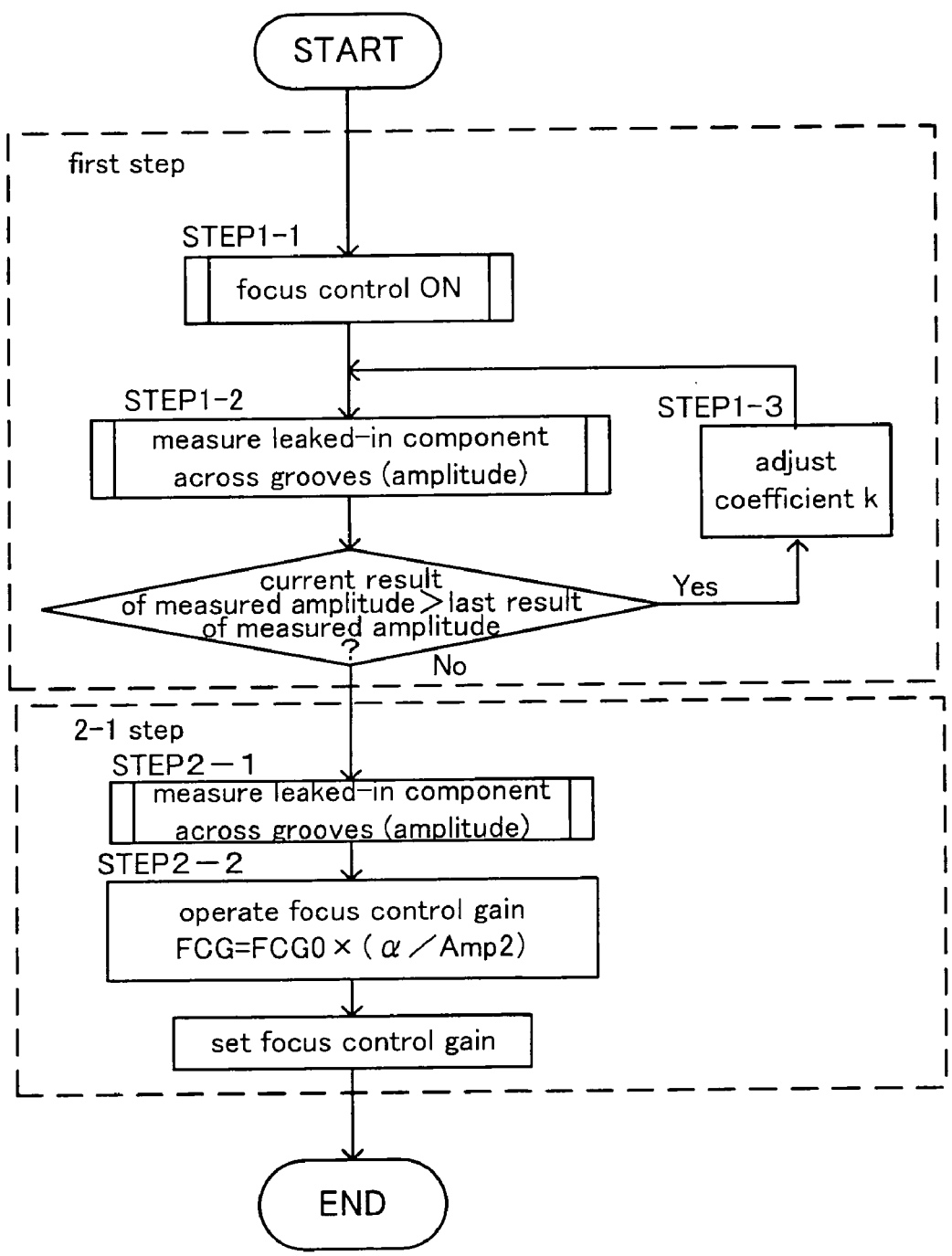
FIG. 7 is a flow chart of a fourth focal control adjusting method according to the preferred embodiment 1.

In the preferred embodiment 1, the first step, 2-1 step and 2-2 step are all conducted. However, only the 2-1 step may be carried out after the first step is conducted as shown in FIG. 7 instead of FIG. 3. In this manner, the focal control can be stably realized without excessively increasing the output of the focal controller 5.

Figure 8:
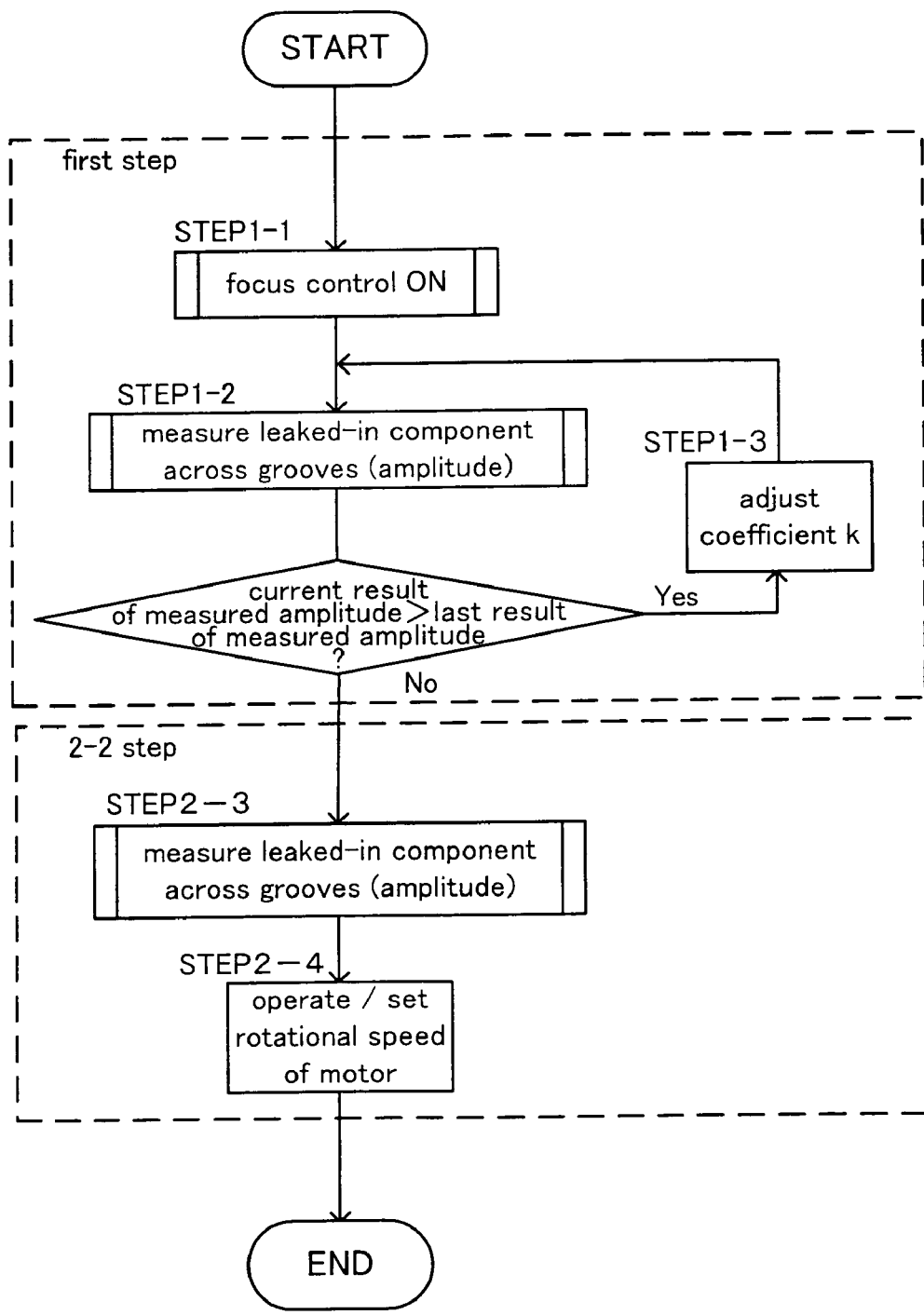
FIG. 8 is a flow chart of a fifth focal control adjusting method according to the preferred embodiment 1.

Alternatively, only the 2-2 step may be carried out after the first step is conducted as shown in FIG. 8 instead of FIG. 3. In this manner, the focal control can be stably realized without excessively increasing the output of the focal controller 5.

Figure 9:
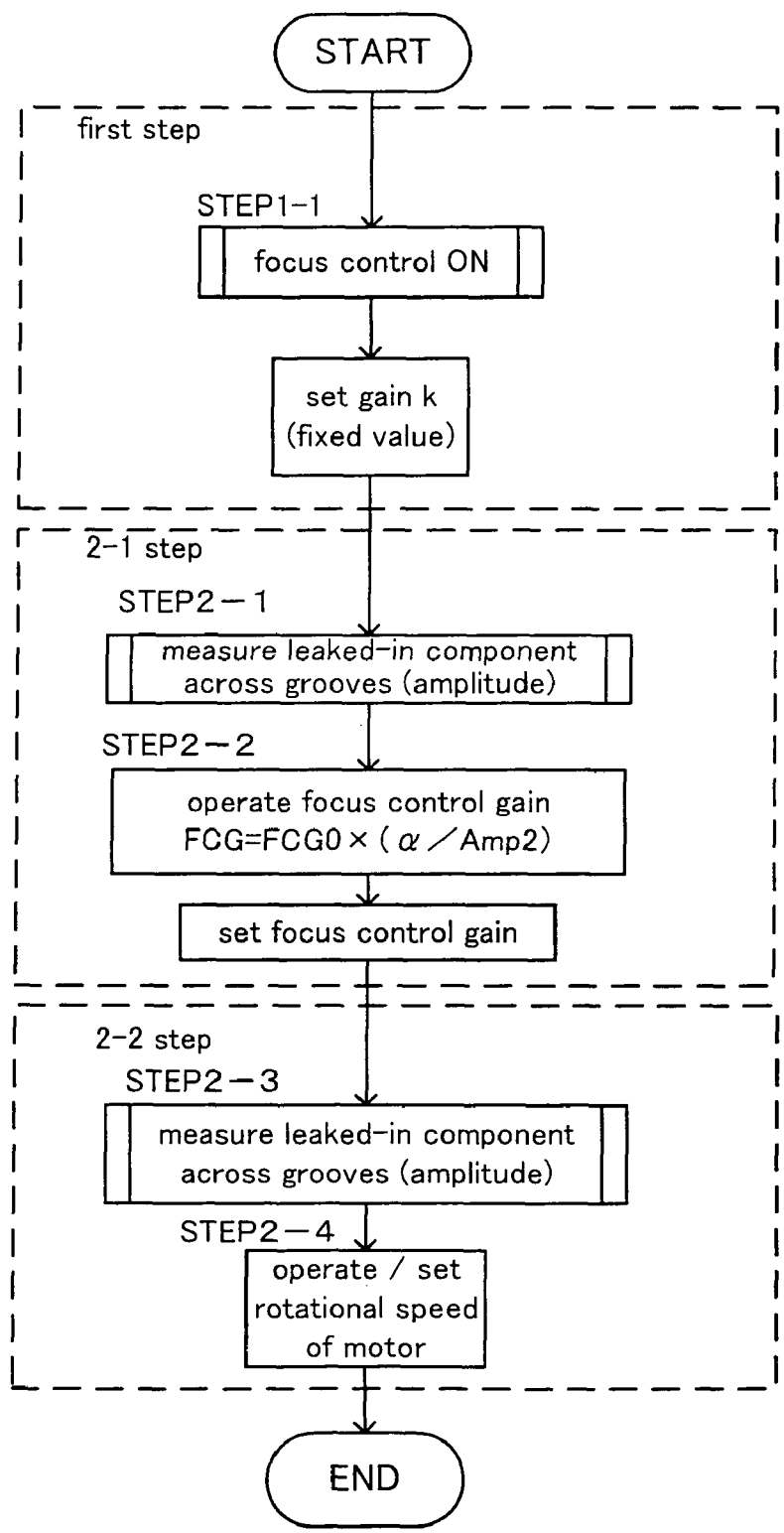
FIG. 9 is a flow chart of a sixth focal control adjusting method according to the preferred embodiment 1.

As shown in FIG. 9, though the coefficient k of the multiplying circuit 4-4 is set to a preset fixed value in the first step, the focal control can be stably realized without excessively increasing the output of the focal controller 5 by conducting the 2-1 step and/or the 2-2 step. Further, a processing time for conducting the first step can be reduced.

When a tracking control loop (not shown) for controlling a positional shift between a track 1-1 of the disk 1 and the light beam spot is open (during the processing) in conducting the steps through the first to 2-2, the light beam spot surely traverses the track 1-1. Therefore, the measurement precision in the STEP 1-2, STEP 2-1 and STEP 2-3 can be much improved as far as these steps are conducted when the tracking control loop is open. Thereby, the precision in the adjustments in the focal control adjusting method according to the present invention can be further improved.

Figure 10:
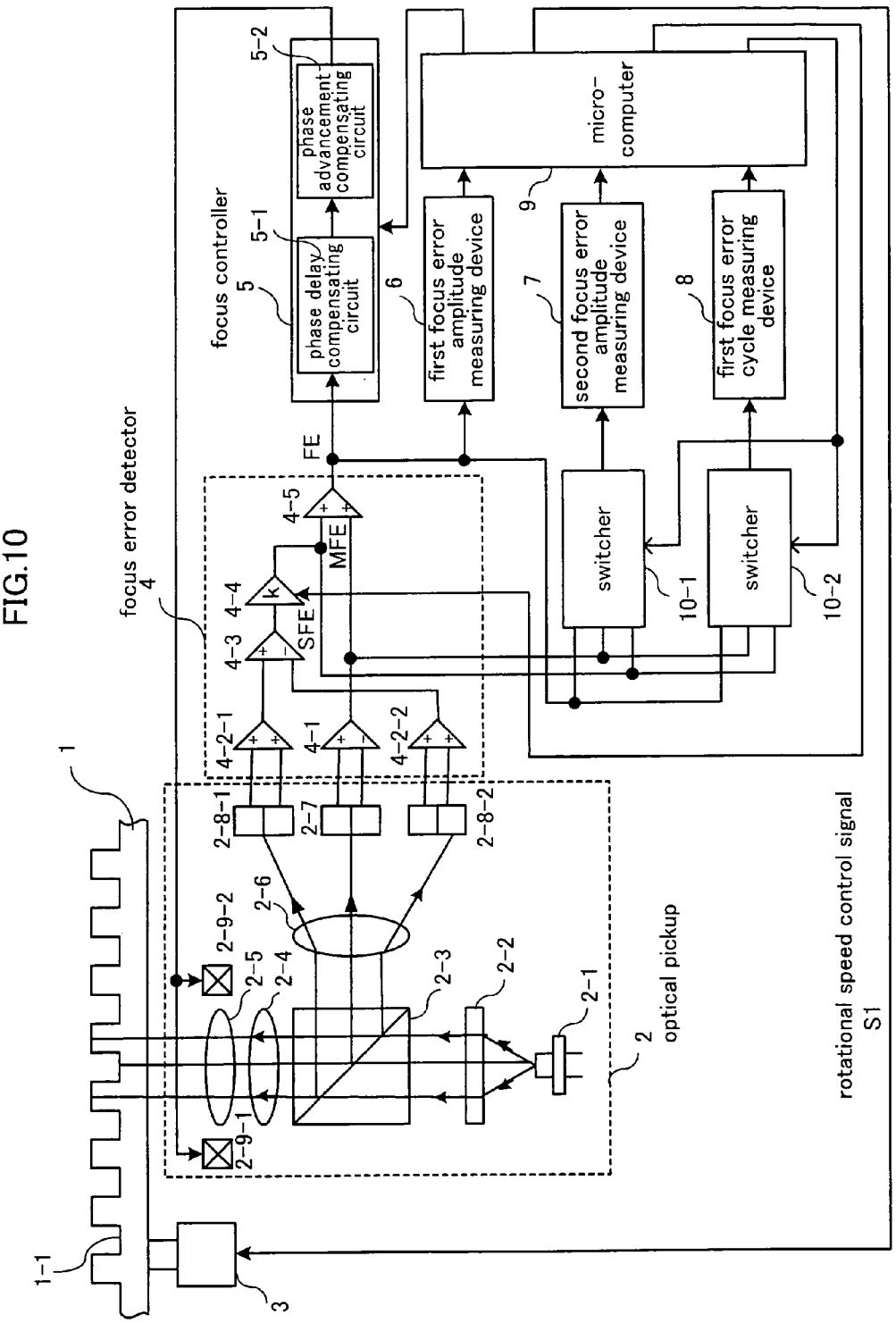
FIG. 10 is a third block diagram of the optical disk apparatus installed the focal control adjusting method according to the preferred embodiment 1.

Further, as shown in FIG. 10, switchers 10-1 and 10-2 may be provided so that any of the focal error signal FE, position detection signal MFE and position detection signal SFE can be selected as the input signals of the second measurement device for an amplitude of focal error 7 and the first measurement device for focal error cycle 8. The amplitude or the cycle of the focal error signal FE detected in the STEP 2-1 and the STEP 2-3 may correspond to the amplitude or the cycle of the position detection signal MFE and the amplitude or the cycle of the position detection signal SFE, in which case a similar effect can be obtained.

The focal control gain FCG and the rotational speed of the motor 3 adjusted in the 2-1 step and the 2-2 step can be applied only when the tracking control loop is open, so that the focal control performance of the optical disk apparatus can be improved.

When the tracking control loop is closed in the case of reproducing or recoding information with respect to the disk 1, the disturbance due to the leaked-in push-pull signal does not affect the focal error signal FE because the light beam spot is controlled on the track 1-1. Therefore, when the tracking control loop is closed, the focal control gain FCG and the rotational speed of the motor 3 determined in the 2-1 step and the 2-2 step are not applied, but the focal control gain is increased to control a surface wobbling component of the disk 1, or the rotational speed of the motor 3 is increased to reproduce or record the information at a higher speed. Thereby, the performance of the optical disk apparatus can be improved.

The rotational speed of the motor 3 may be determined based on the measurement result of the first measurement device for focal error cycle 8.

Preferred Embodiment 2

Figure 11:
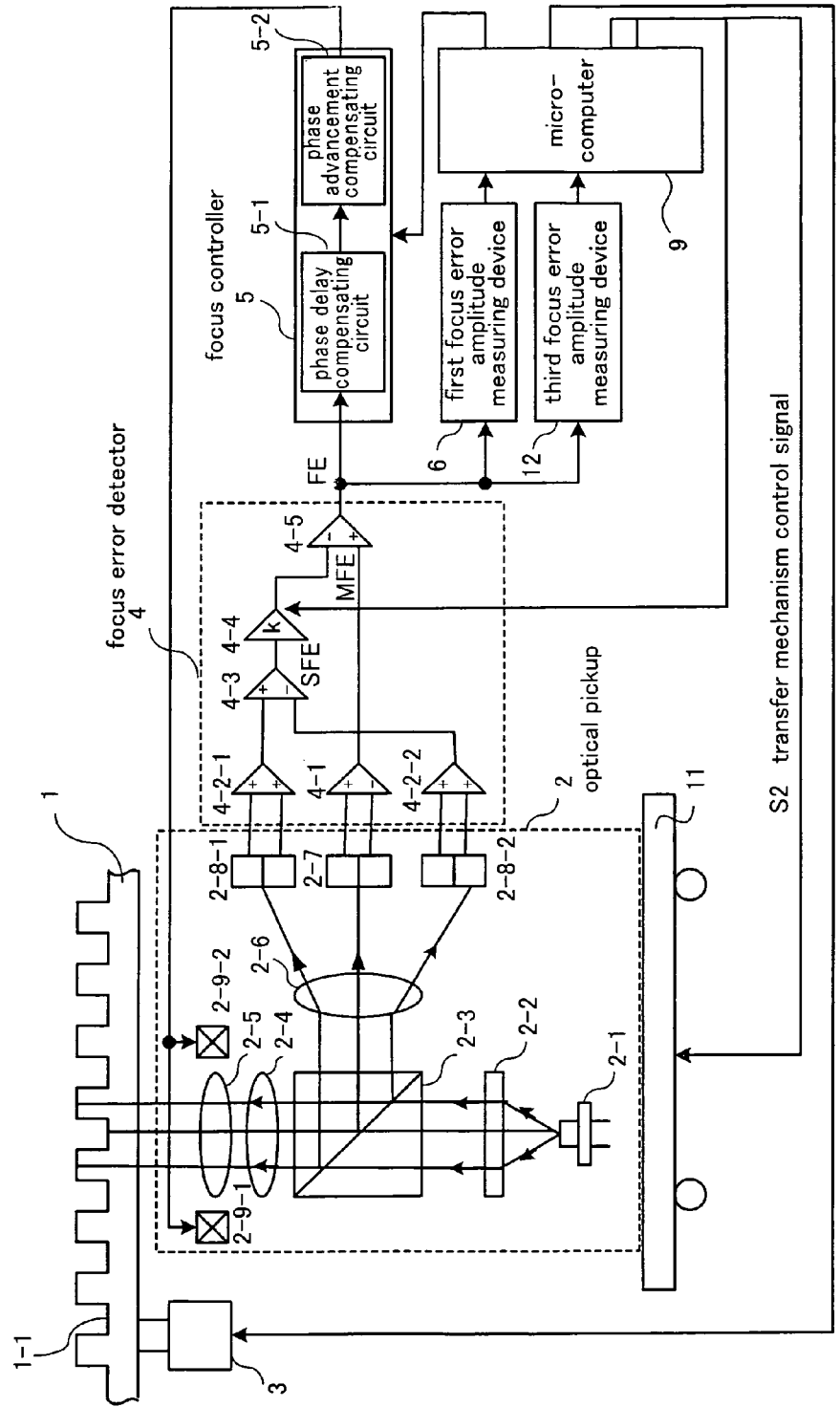
FIG. 11 is a first block diagram of an optical disk apparatus installed a focal control adjusting method according to a preferred embodiment 2 of the present invention.

FIG. 11 is a block diagram illustrating an example of an optical disk apparatus in which a focal control adjusting method according to a preferred embodiment 2 of the present invention is installed. The reference numerals shown in FIG. 11 corresponding to those shown in FIG. 1 denote the same components, which are, therefore, not described in detail again. In FIG. 11, a reference numeral 11 denotes a transfer mechanism for moving the optical pickup 2 to an arbitrary position in direction to traverse the track 1-1 of the disk 1. The transfer mechanism 11 can move the object lens 2-5, which is a component of the optical pickup 2, to the arbitrary position in direction to traverse the track 1-1. Therefore, the transfer mechanism 11 can also move the light beam spot to an arbitrary position in direction to traverse the track 1-1. The transfer mechanism 11 is position-controlled based on a transfer mechanism control signal S2 supplied from the microcomputer 9. A reference numeral 12 denotes a third measurement device for an amplitude of focal error to measure the amplitude of the focal error signal FE from the maximum and minimum values thereof and outputting the measurement result to the microcomputer 9 as Amp3.

Figure 12:
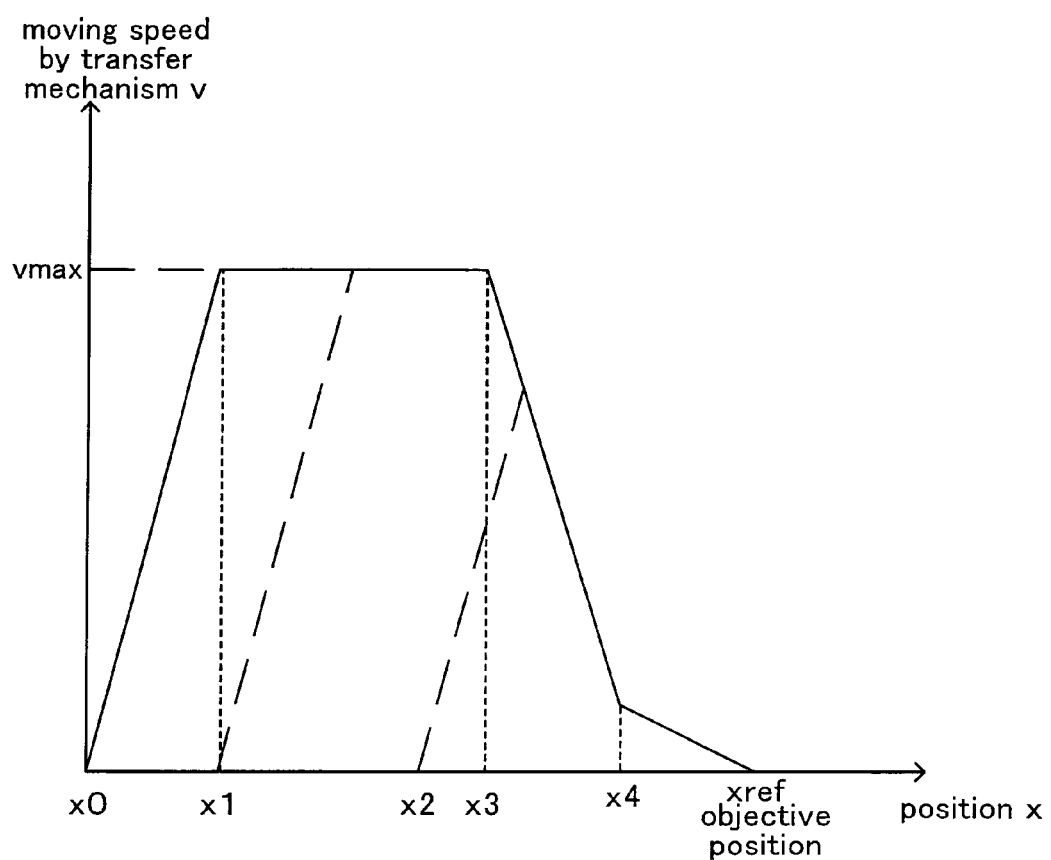
FIG. 12 is a relation diagram between a relative position from a current position to a objective position in a transfer mechanism and a moving speed of the transfer mechanism controlled by a microcomputer according to the preferred embodiment 2.

The transfer mechanism control signal S2 outputted from the microcomputer 9 to the transfer mechanism 11 is described referring to FIG. 12. FIG. 12 shows a characteristic of the transfer mechanism control signal S2 outputted from the microcomputer 9 to the transfer mechanism 11, wherein a moving speed by the transfer mechanism 11 is plotted in a vertical axis, and a position of the transfer mechanism 11 is plotted in a horizontal axis. The microcomputer 9 outputs the transfer mechanism control signal S2 in accordance with a profile shown in FIG. 12 based on a current position and an objective position of the transfer mechanism 11. For example, when a beam condensing spot is moved from a position x0 to an objective position xref, a value of the transfer mechanism control signal S2 is adjusted in the microcomputer 9 so that a moving speed of the beam condensing spot is increased. The value of the transfer mechanism control signal S2 is adjusted so that a moving speed v reaches a maximum speed vmax as a uniform rate when the beam condensing spot reaches a position x1. When the beam condensing spot reaches a position x3, the value of the transfer mechanism control signal S2 is adjusted so that the moving speed by the transfer mechanism 11 is reduced. When the beam condensing spot reaches a position x4, the value of transfer mechanism control signal S2 is adjusted so that the moving speed is further reduced. Such a control mode is applied in a similar manner when an initial position of the transfer mechanism 11 changes as shown by x1 in FIG. 12. In the case where the moving speed v of the transfer mechanism 11 fails to reach the maximum speed vmax in an interval where the moving speed by the transfer mechanism 11 is increased as exemplified in the case where the initial position of the transfer mechanism 11 is at a position x2, the value of the transfer mechanism control signal S2 is adjusted so that the moving speed is reduced.

The preferred embodiment 2 is characterized in that, by further conducting the STEP 1-1 and the STEP 1-2 in the construction according to the preferred embodiment 1 so that the maximum speed vmax of the transfer mechanism control signal S2 outputted to the transfer mechanism 11 is restricted by the microcomputer 9 in accordance with the amplitude or frequency of the disturbance due to the leaked-in push-pull signal superposed on the focal error signal FE in a state where the disturbance is adjusted.

Figure 13:
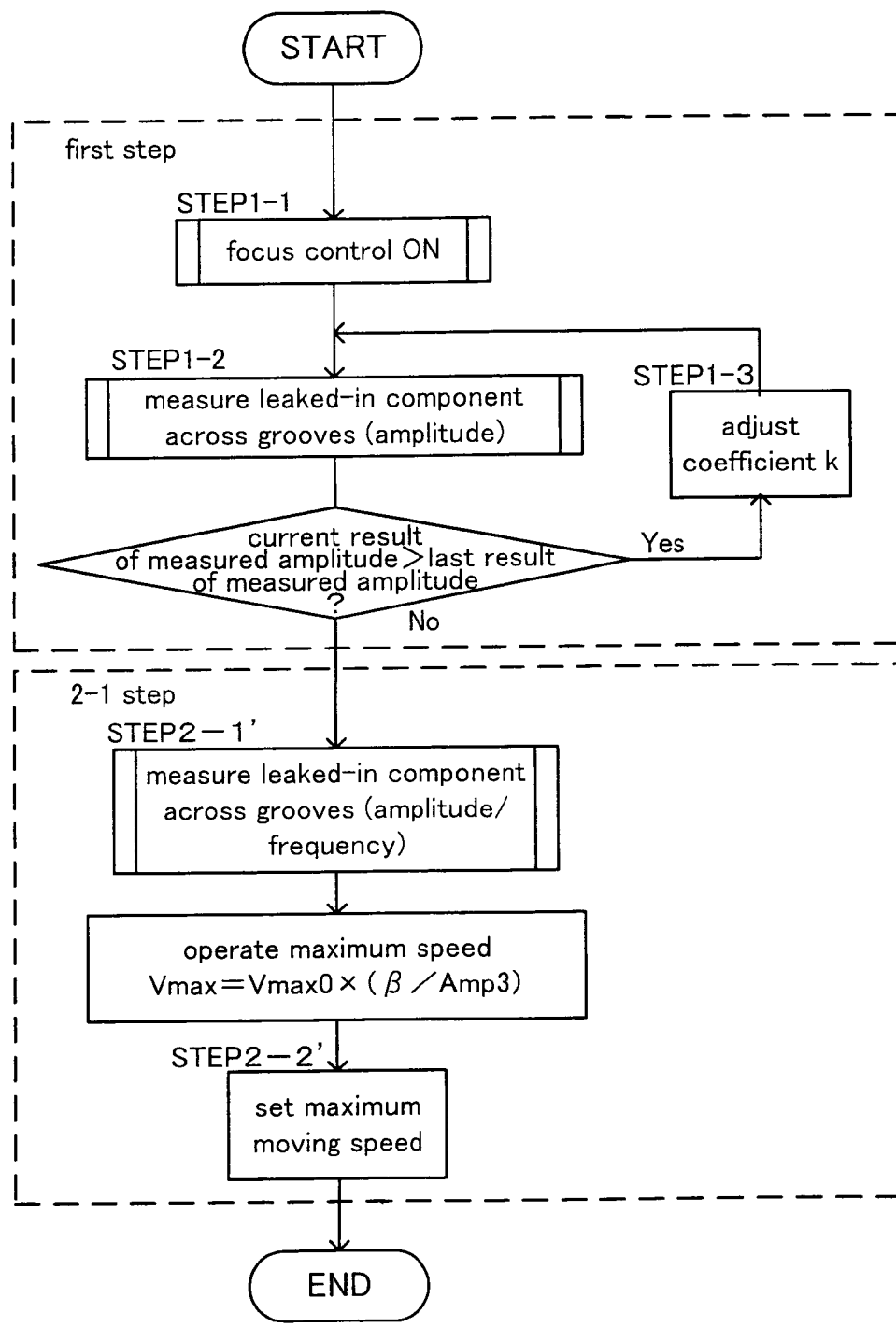
FIG. 13 is a flow chart of a focal control adjusting method according to the preferred embodiment 2.

The foregoing focal control adjusting method is more specifically described referring to FIG. 13. FIG. 13 is a flow chart of an example of the focal control adjusting method according to the preferred embodiment 1.

In a manner similar to the preferred embodiment 1, the gain (coefficient) k of the multiplying circuit 4-4 is adjusted to such a value that the influence of the disturbance due to the leaked-in push-pull signal superposed on the focal error signal FE is controlled at the lowest level.

First, the focal control loop is closed in a state where an arbitrary value is set as the gain (coefficient) k of the multiplying circuit 4-4 (STEP 1-1). Under a state that the loop is closed, the first measurement device for an amplitude of focal error 6 measures the amplitude of the focal error signal FE from the maximum and minimum values thereof and outputs the measurement result to the microcomputer 9 (STEP 1-2). The microcomputer 9 memorizes the measurement result of the first measurement device for an amplitude of focal error 6, and updates the coefficient k of the multiplying circuit 4-4 based on the comparison result obtained by comparing the last measurement result of the measuring device 6 and the current measurement result of the measuring device 6. The updating processing is repeatedly executed so that the coefficient k of the multiplying circuit 4-4 is adjusted in such a manner that the output of the first measurement device for an amplitude of focal error 6 is minimized.

It is desirable to make null the disturbance due to the leaked-in push-pull signal superposed on the focal error signal FE by repeating the STEP 1-1 through the STEP 1-3. However, it may not be possible in some cases to make null the disturbance due to the leaked-in push-pull signal superposed on the focal error signal FE since the mounting precisions of the optical components consisting of the optical pickup 2 and the transfer mechanism (not shown) 11, and the depths of the disk grooves may be variable. Therefore, in the present preferred embodiment, by conducting a 2-1' step described below so that any excessively large drive signal is not supplied to the two-dimensional actuators 2-9-1 and 2-9-2 when the light beam spot is moved based on the operation of the transfer mechanism 11, the maximum speed vmax of the transfer mechanism control signal S2 is adjusted.

Below is given a description of the 2-1 step'. The third measurement device for an amplitude of focal error 12 measures the amplitude of the focal error signal FE based on the maximum and minimum values thereof, and outputs the measurement result Amp3 to the microcomputer 9 (STEP 2-1'). Then, the microcomputer 9 calculates the maximum speed vmax of the transfer mechanism control signal S2 using the measurement result Amp3 based on the following equation (5).

$$vmax = vmax0 \times (\beta / Amp3) \quad (5)$$

$\beta$ is an arbitrary coefficient, and the maximum speed vmax of the transfer mechanism control signal S2 is adjusted to be inversely proportional to the measurement result Amp3 (STEP 2-2'). Thereby, even in the case where the influence of the disturbance due to the leaked-in push-pull signal remains on the focal error signal FE after the STEP 1-1 and the STEP 1-2 are carried out, the maximum value of the moving speed by the transfer mechanism 11 is adjusted in the 2-1 step', so that the focal control can be stably realized without supplying any excessively large drive signal to the two-dimensional actuators 2-9-1 and 2-9-2.

Figure 14:
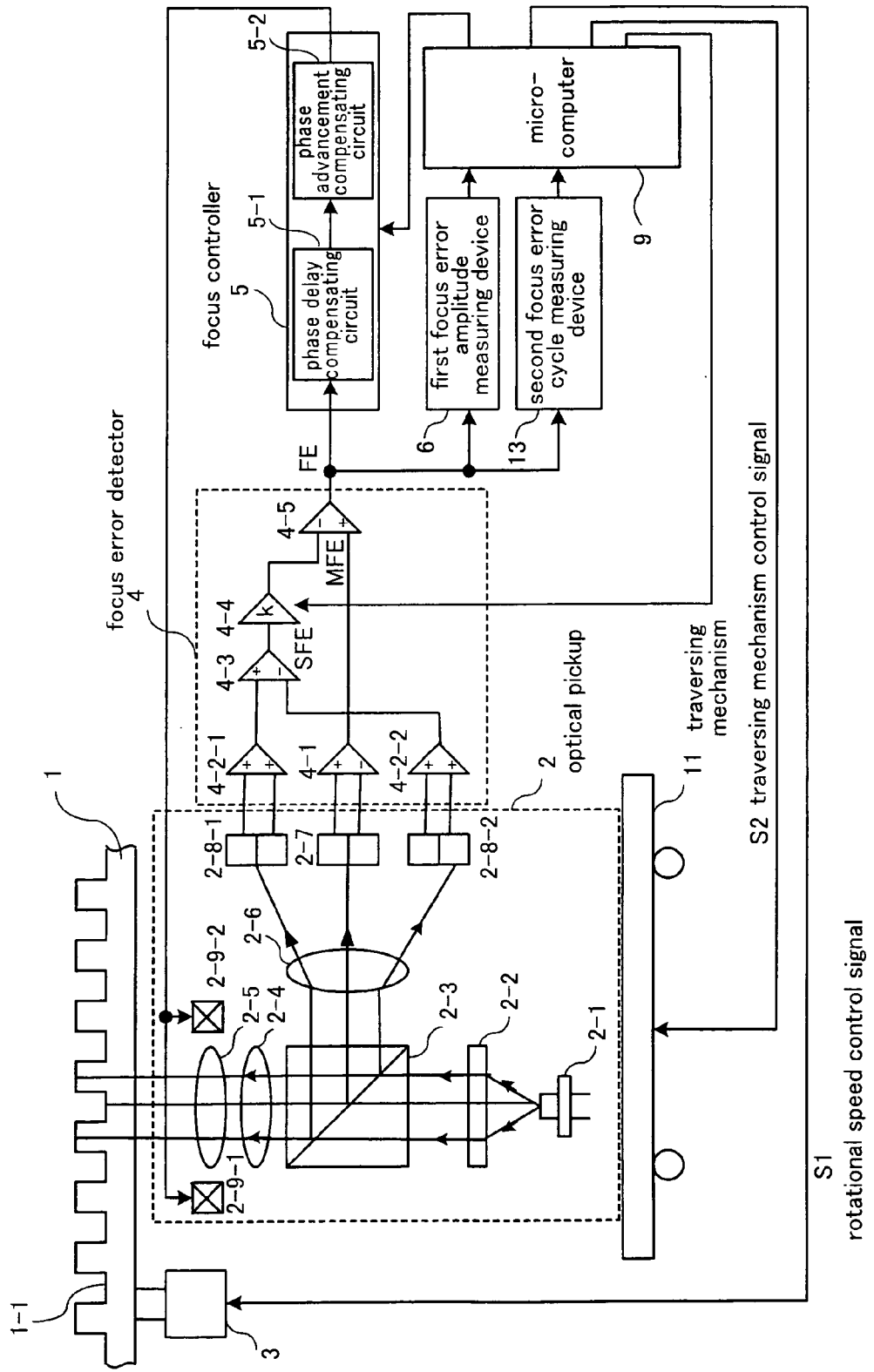
FIG. 14 is a second block diagram of the optical disk apparatus installed the focal control adjusting method according to the preferred embodiment 2.

An adjustment processing similar to the adjustment processing described above can be executed in the case where a second measurement device for focal error cycle 13 is adopted in place of the third measurement device for an amplitude of focal error 12 as shown in FIG. 14. Below is given a description of a control method to use the second measurement device for focal error cycle 13.

The second measurement device for focal error cycle 13 measures the cycle of the focal error signal FE and output the measured cycle to the microcomputer 9. The microcomputer 9 memorizes the measurement result of the second measurement device for focal error cycle 13 and updates the coefficient k of the multiplying circuit 4-4 based on the result obtained by comparing the last measurement result of the measuring device 13 to the current measurement result of the measuring device 13. The updating processing is repeatedly executed so that the coefficient k of the multiplying circuit 4-4 is adjusted in such a manner that the output of the first measurement device for an amplitude of focal error 6 is minimized.

After from the STEP 1-1 to the STEP 1-3 are conducted, the maximum value, minimum value or average value of the cycle of the focal error signal FE is measured and outputted to the microcomputer 9. For example, the microcomputer 9 detects the minimum value of the cycle of the focal error signal FE as the output of the second measurement device for focal error cycle 13 to thereby detect an eccentric maximum speed of the disk 1. The microcomputer 9 controls the speed of the transfer mechanism 11 so that a sum of the eccentric speed of the disk 1 and the speed at which the light beam traverses the track 1-1 corresponds to a predetermined speed.

Figure 15:
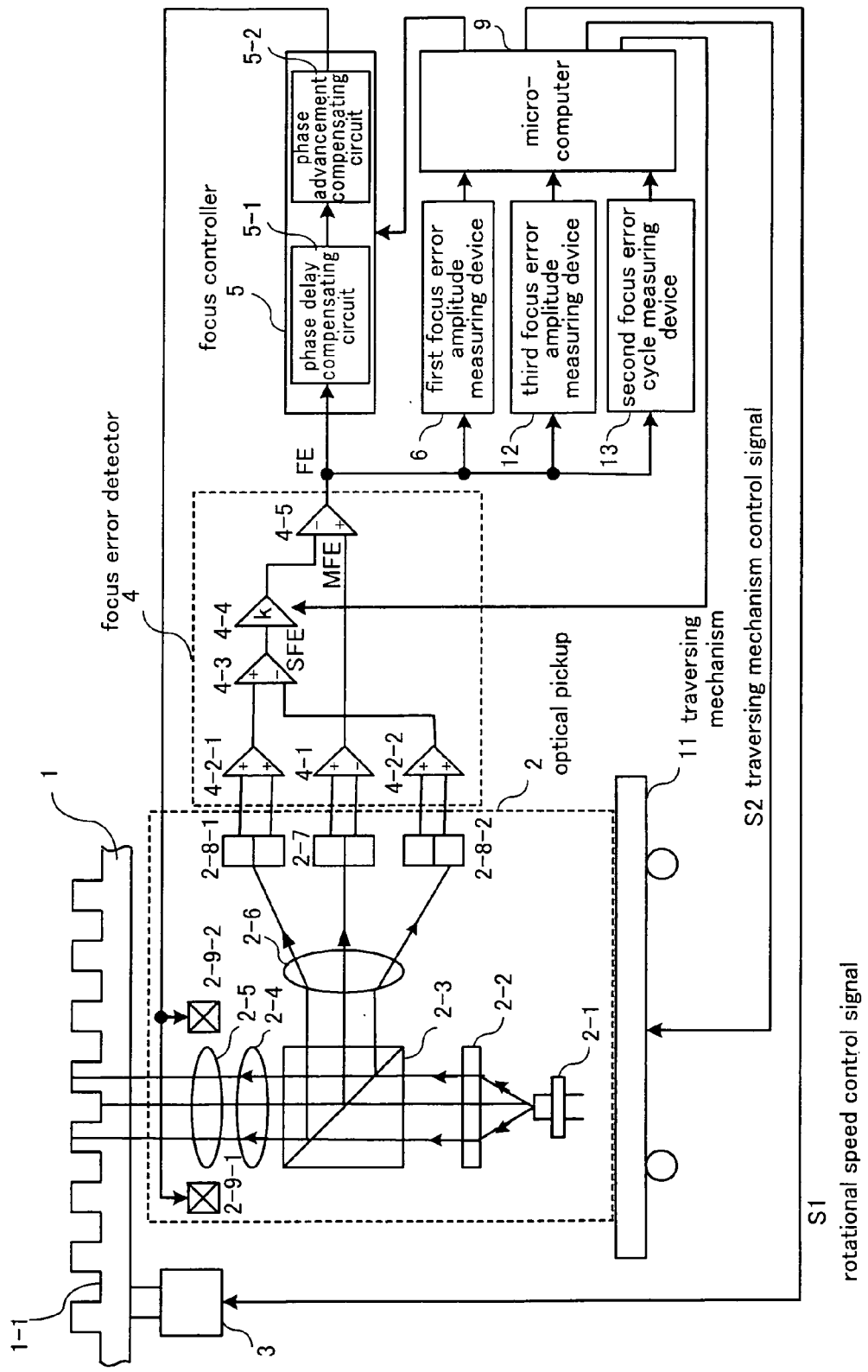
FIG. 15 is a third block diagram of the optical disk apparatus installed the focal control adjusting method according to the preferred embodiment 2.
Figure 16:
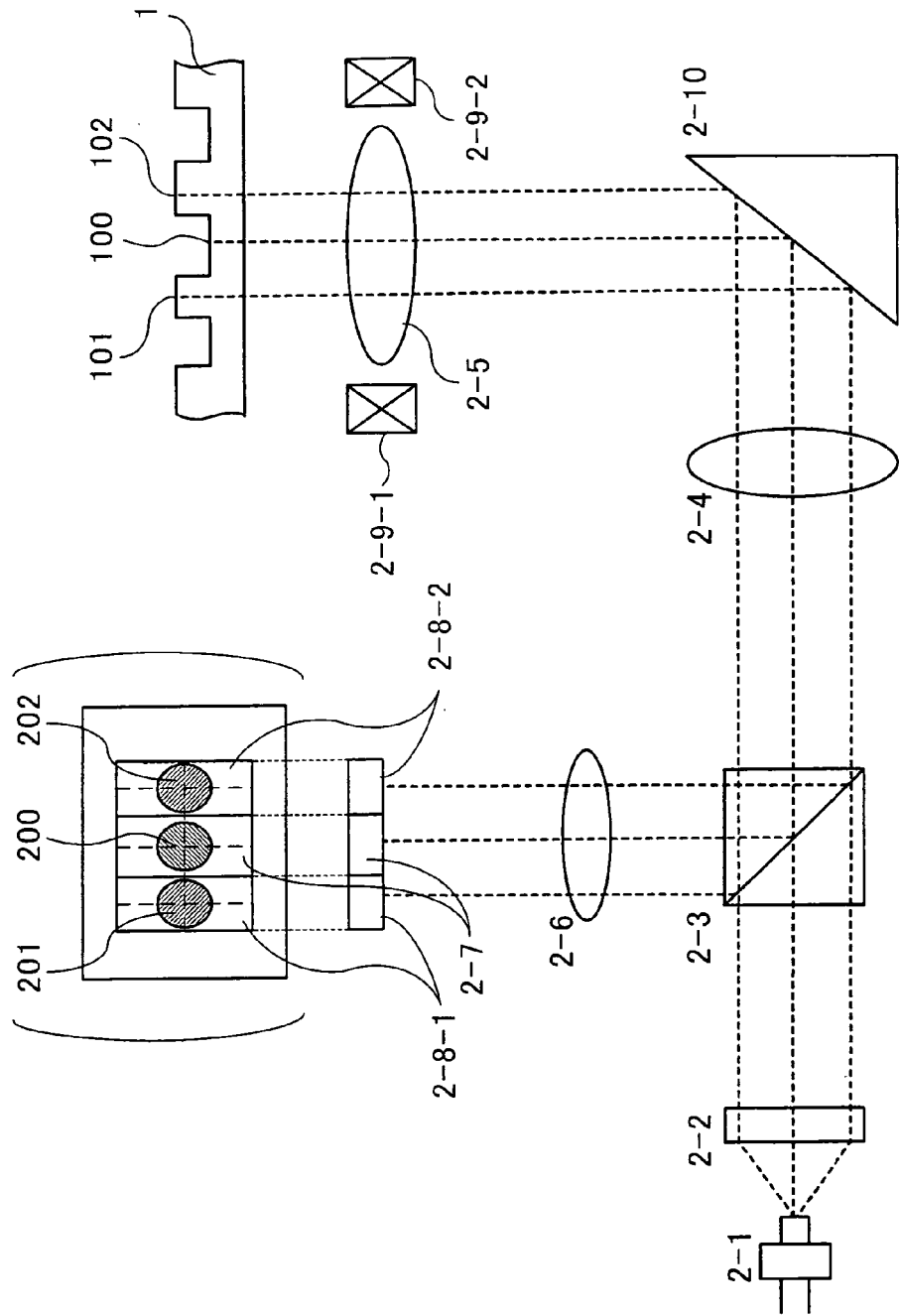
FIG. 16 is a diagram of a structure of the components in an optical pickup according to a conventional technology.

As shown in FIG. 15, the microcomputer 9 may adjust the moving speed by the transfer mechanism 11 based on the output of the third measurement device for an amplitude of focal error 12 and the output of the second measurement device for focal error cycle 13, the control precision can be further improved by doing so.

More specifically, the moving speed by the transfer mechanism 11 is adjusted as described in accordance with the measurement result of the second measurement device for focal error cycle 13 only when the measurement result of the third measurement device for an amplitude of focal error 12 is equal to or higher than a predetermined value. Accordingly, not only an accessing time for reproducing or recording the information of the disk 1 can reduced but also the focal control can be stabilized.

In the preferred embodiment 2, though the 2-1 step' (STEP 2-1'-STEP 2-2') is carried out after the first step (STEP 1-1-STEP 1-3) is done, one of the 2-1 step and the 2-2 step may be conducted after the first step is carried out as in the preferred embodiment 1, followed by the conduction of the 2-1 step', even in which case a similar effect can be obviously obtained.

In the preferred embodiment 2, though the 2-1 step' is always carried out after the first step is conducted, the STEP 2-2' and steps thereafter may be omitted in accordance with the measurement result of the third measurement device for an amplitude of focal error 12 or the measurement result of the second measurement device for focal error cycle 13 obtained when the STEP 2-1' is done.

In the preferred embodiment 2, the focal error signal FE is inputted to the third measurement device for an amplitude of focal error 12 and the second measurement device for focal error cycle 13 as shown in FIGS. 11, 14 and 15, but the position detection signal MFE and the position detection signals SFE may be inputted to these measuring devices 12 and 13, though not shown, in which case a similar effect can be obtained.

In the preferred embodiment 2, the first measurement device for an amplitude of focal error 6 measures the amplitude of the focal error signal FE in order to determine the coefficient k of the multiplying circuit 4-4 as shown in FIGS. 10, 11, 14 and 15. However, though not specifically shown, after the measurement device for driving focal control 14 may measure the output of the focal controller 5 (see FIG. 4), and may determine the coefficient k of the multiplying circuit 4-4 based on the obtained measurement result, in which case a similar effect can be obtained.

While there has been described what is at present considered to be preferred embodiments of this invention, it will be understood that various modifications may be made therein, and it is intended to cover all such modifications in the appended claims as fall within the true spirit and scope of this invention.

What is claimed is:

1. A focal control adjusting method comprising:
   a first step for detecting a focal error signal obtained through condensing and irradiating a light beam on a rotating recording medium; and
   a second step for setting a focal control gain for controlling a positional shift between a recording surface of the recording medium and the light beam based on the focal error signal detected in the first step, wherein:
   three beam condensing spots are formed on the rotating recording medium through condensing and irradiating the light beam consisting of a main light beam and two sub light beams on the recording medium, a first position detection signal indicating a position of the beam condensing spot in the main light beam is generated based on a main reflected light obtained through reflection of the main light beam on the recording medium, and second position detection signals indicating positions of the beam condensing spots in the sub light beams are generated based on two sub reflected lights that are reflected on the recording medium and have phases different from that of the main reflected light in the first step,
   a result obtained by multiplying the second position detection signal by a preset coefficient is added to the first position detection signal, and a result of the addition is detected as the focal error signal in the first step,
   the coefficient is set in accordance with the focal error signal in the first step,
   the focal control gain is set in accordance with the focal error signal, the first position detection signal or the second position detection signals in the second step, and
   the focal control gain is applied only when a tracking control loop for controlling the positional shift between the track of the recording medium and the light beam is open in focal adjustment of the light beam based on the focal error signal detected in the first step and the focal control gain set in the second step.

2. The focal control adjusting method according to claim 1, wherein
   a rotational speed of the recording medium is set in accordance with the focal error signal, the first position detection signal or the second position detection signals in place of setting the focal control gain in the second step.

3. The focal control adjusting method according to claim 2, wherein
   the rotational speed of the recording medium is set in accordance with an amplitude of the focal error signal, an amplitude of the first position detection signal or amplitude of the second position detection signals in the second step.

4. The focal control adjusting method according to claim 3, wherein
   the amplitude during a time when a tracking control loop for controlling the positional shift between the track of the recording medium and the light beam is open is used as the amplitude of the focal error signal in the second step.

5. The focal control adjusting method according to claim 2, wherein
   the rotational speed of the recording medium is set in accordance with a cycle of the focal error signal, a cycle of the first position detection signal or cycles of the second position detection signals at a time when the beam condensing spot traverses the track of the recording medium in the second step.

6. The focal control adjusting method according to claim 2, wherein
   the set rotational speed of the recording medium is applied only when a tracking control loop for controlling the positional shift between the track of the recording medium and the light beam is open in conducting focal adjustment of the light beam based on the focal error signal detected in the first step and the focal control gain set in the second step.

7. The focal control adjusting method according to claim 1, wherein
   a rotational speed of the recording medium is further set in accordance with the focal error signal, the first position detection signal or the second position detection signals after the focal control gain is set in the second step.

8. The focal control adjusting method according to claim 7, wherein:
   the rotational speed of the recording medium is set in accordance with an amplitude of the focal error signal, an amplitude of the first position detection signal or amplitude of the second position detection signals in the second step.

9. The focal control adjusting method according to claim 8, wherein
   the focal control gain is determined to be substantially inversely proportional to the amplitude of the focal error signal, the amplitude of the first position detection signal or the amplitude of the second position detection signals in the second step.

10. The focal control adjusting method according to claim 8, wherein
    the amplitude during a time when a tracking control loop for controlling the positional shift between the track of the recording medium and the light beam is open is used as the amplitude of the focal error signal in the second step.

11. The focal control adjusting method according to claim 7, wherein
    the focal control gain is set in accordance with a cycle of the focal error signal, a cycle of the first position detection signal or cycles of the second position detection signals at a time when the beam condensing spot traverses the track of the recording medium in the second step.

12. The focal control adjusting method according to claim 7, wherein the rotational speed of the recording medium is decided in accordance with a cycle of the focal error signal, a cycle of the first position detection signal or cycles of the second position detection signals when the beam condensing spot traverses the track of the recording medium in the second step.

13. The focal control adjusting method according to claim 7, wherein
the focal control gain is applied only when a tracking control loop for controlling the positional shift between the track of the recording medium and the light beam is open in conducting focal adjustment of the light beam based on the focal error signal detected in the first step and the focal control gain set in the second step.

14. The focal control adjusting method according to claim 7, wherein
the set the rotational speed of the recording medium is applied only when a tracking control loop for controlling the positional shift between the track of the recording medium and the light beam is open conducting focal adjustment of the light beam based on the focal error signal detected in the first step and the focal control gain set in the second step.

15. The focal control adjusting method according to claim 1, wherein
the focal control gain is set after a rotational speed of the recording medium is set in accordance with the focal error signal, the first position detection signal or the second position detection signals in the second step.

16. The focal control adjusting method according to claim 15, wherein
the focal control gain is set to be substantially inversely proportional to an amplitude of the focal error signal, an amplitude of the first position detection signal or amplitude of the second position detection signals in the second step.

17. The focal control adjusting method according to claim 16, wherein
the amplitude during a time when a tracking control loop for controlling the positional shift between the track of the recording medium and the light beam is open is used as the amplitude of the focal error signal in the second step.

18. The focal control adjusting method according to claim 15, wherein
a rotational speed of the recording medium is set in accordance with an amplitude of the focal error signal, an amplitude of the first position detection signal or amplitude of the second position detection signals in place of setting the focal control gain in the second step.

19. The focal control adjusting method according to claim 18, wherein
the amplitude during a time when a tracking control loop for controlling the positional shift between the track of the recording medium and the light beam is open is used as the amplitude of the focal error signal in the second step.

20. The focal control adjusting method according to claim 15, wherein
the focal control gain is set in accordance with a cycle of the focal error signal at a time when the beam condensing spot traverses the track of the recording medium, or a cycle of the first position detection signal or cycle of the second position detection signals in the second step.

21. The focal control adjusting method according to claim 15, wherein
a rotational speed of the recording medium is set in accordance with a cycle of the focal error signal at a time when the beam condensing spot traverses the track of the recording medium, or a cycle of the first position detection signal or cycle of the second position detection signals in the second step.

22. The focal control adjusting method according to claim 15, wherein
the focal control gain is applied only when a tracking control loop for controlling the positional shift between the track of the recording medium and the light beam is open in conducting focal adjustment of the light beam based on the focal error signal detected in the first step and the focal control gain set in the second step.

23. The focal control adjusting method according to claim 15, wherein
the set rotational speed of the recording medium is applied only when a tracking control loop for controlling the positional shift between the track of the recording medium and the light beam is open in conducting focal adjustment of the light beam based on the focal error signal detected in the first step and the focal control gain set in the second step.

24. An optical disk apparatus comprising:
light detectors to receive a main reflected light obtained through reflection of the main light beam on the recording medium and two sub reflected lights that are obtained through reflection of the sub light beams on the recording medium and have phases different from that of the main reflected light after forming three beam condensing spots on a rotating recording medium by condensing and irradiating a light beam consisting of a main light beam and two sub light beams on the recording medium,
a focal error detector to add a result obtained by multiplying a second position detection signal by a preset coefficient to a first position detection signal and detect the result of the addition as a focal error signal of the light beams after generating the first position detection signal indicating a position of the beam condensing spot in the main light beam based on the main reflected light and the second position detection signal indicating position of the beam condensing spot in the sub light beams based on the sub reflected lights;
a focal controller;
a measurement device for the amplitude of focal error to measure an amplitude of the focal error signal, an amplitude of the first position detection signal or amplitude of the second position detection signal, wherein:
the focal error detector sets the coefficient in accordance with a result of the positional shift control by the focal controller,
the focal error detector sets the coefficient in accordance with a result of the measurement by the measurement device for driving a focal control, and
the focal controller sets a rotational speed of the motor in accordance with a result of the measurement by the measurement device for an amplitude of focal error, and
the set rotational speed of the recording medium is applied only when a tracking control loop for controlling the positional shift between the track of the recording medium and the light beam is open.

25. The optical disk apparatus according to claim 24, further comprising a measurement device for focal error cycle to measure a cycle of the focal error signal, a cycle of the first position detection signal or cycle of the second position detection signal, wherein the focal controller sets a rotational speed of the motor in accordance with a result of the measurement by the measurement device for focal error cycle.

26. An optical disk apparatus comprising:

light detectors to receive a main reflected light obtained through reflection of the main light beam on the recording medium and two sub reflected lights that are obtained through reflection of the sub light beams on the recording medium and have phases different from that of the main reflected light after forming three beam condensing spots on a rotating recording medium by condensing and irradiating a light beam consisting of a main light beam and two sub light beams on the recording medium, a focal error detector to add a result obtained by multiplying a second position detection signal by a preset coefficient to a first position detection signal and detect the result of the addition as a focal error signal of the light beams after generating the first position detection signal indicating a position of the beam condensing spot in the main light beam based on the main reflected light and the second position detection signal indicating position of the beam condensing spot in the sub light beams based on the sub reflected lights;

a focal controller for controlling a positional shift between the beam condensing spots and a recording surface of the recording medium based on the focal error signal;

a motor for rotating the recording medium;

a measurement device for driving a focal control to measure an output of the focal controller; and a second measurement device for an amplitude of focal error to measure an amplitude of the focal error signal, an amplitude of the first position detection signal or amplitude of the second position detection signal, wherein:

the focal error detector sets the coefficient in accordance with a result of the positional shift control by the focal controller, the focal error detector sets the coefficient in accordance with a result of the measurement by the measurement device for driving a focal control, and the focal controller sets a rotational speed of the motor in accordance with a result of the measurement by the second measurement device for an amplitude of focal error, and the set rotational speed of the recording medium is applied only when a tracking control loop for controlling the positional shift between the track of the recording medium and the light beam is open.

27. The optical disk apparatus according to claim 26, further comprising a measurement device for focal error cycle to measure a cycle of the focal error signal, a cycle of the first position detection signal or cycle of the second position detection signal, wherein the focal controller sets a rotational speed of the motor in accordance with a result of the measurement by the measurement device for focal error cycle.

* * * * *